US009843819B2

(12) United States Patent
Komiya et al.

(10) Patent No.: US 9,843,819 B2
(45) Date of Patent: Dec. 12, 2017

(54) IMAGE ENCODING METHOD, IMAGE DECODING METHOD, IMAGE ENCODING DEVICE, AND IMAGE DECODING DEVICE

(71) Applicant: Panasonic Intellectual Property Corporation of America, Torrance, CA (US)

(72) Inventors: Daisaku Komiya, Tokyo (JP); Takahiro Nishi, Nara (JP); Hisao Sasai, Osaka (JP); Youji Shibahara, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: Sun Patent Trust, New York, NY (US)

( * ) Notice: Subject to any disclaimer, the term of this patent is extended or adjusted under 35 U.S.C. 154(b) by 416 days.

(21) Appl. No.: 14/411,930

(22) PCT Filed: Jun. 28, 2013

(86) PCT No.: PCT/JP2013/004056
§ 371 (c)(1),
(2) Date: Dec. 30, 2014

(87) PCT Pub. No.: WO2014/010192
PCT Pub. Date: Jan. 16, 2014

(65) Prior Publication Data
US 2015/0172713 A1 Jun. 18, 2015

Related U.S. Application Data

(60) Provisional application No. 61/669,277, filed on Jul. 9, 2012.

(51) Int. Cl.
*H04N 19/52* (2014.01)
*H04N 19/597* (2014.01)
(Continued)

(52) U.S. Cl.
CPC ........... *H04N 19/597* (2014.11); *H04N 19/30* (2014.11); *H04N 19/423* (2014.11); *H04N 19/52* (2014.11);
(Continued)

(58) Field of Classification Search
CPC ............................. H04N 19/30; H04N 19/52
See application file for complete search history.

(56) References Cited

U.S. PATENT DOCUMENTS

| 2010/0098154 A1 | 4/2010 | Lou et al. | |
| 2012/0069903 A1* | 3/2012 | Lim | H04N 13/0066 375/240.12 |

(Continued)

FOREIGN PATENT DOCUMENTS

| JP | 2008-271217 | 11/2008 |
| JP | 2010-524394 | 7/2010 |

(Continued)

OTHER PUBLICATIONS

International Search Report dated Oct. 1, 2013 in International (PCT) Application No. PCT/JP2013/004056.
(Continued)

*Primary Examiner* — William C Vaughn, Jr.
*Assistant Examiner* — Jerry Jean Baptiste
(74) *Attorney, Agent, or Firm* — Wenderoth, Lind & Ponack, L.L.P.

(57) ABSTRACT

An image encoding method for encoding a multiview video is provided. The method includes: determining a maximum number of per-picture pixels and a maximum buffer size which corresponds to a maximum number of candidate reference images for use in a non-multiview coding, based on a level signal representing a coding level with reference to a table; calculating a maximum number of candidate reference views for use in inter-view predictive coding using (Continued)

the maximum number of per-picture pixels, an image size of an input image, and a scale factor for use in multiview video coding; and calculating an MVC maximum buffer size corresponding to a maximum number of candidate reference images for use in multiview video coding, using the maximum number of views, and the maximum buffer size.

7 Claims, 27 Drawing Sheets

(51) Int. Cl.
    *H04N 19/70*         (2014.01)
    *H04N 19/423*       (2014.01)
    *H04N 19/573*       (2014.01)
    *H04N 19/577*       (2014.01)
    *H04N 19/30*         (2014.01)

(52) U.S. Cl.
    CPC ......... *H04N 19/573* (2014.11); *H04N 19/577* (2014.11); *H04N 19/70* (2014.11)

(56) References Cited

U.S. PATENT DOCUMENTS

| | | | |
|---|---|---|---|
| 2012/0257838 A1 | 10/2012 | Kitagawa et al. | |
| 2014/0003525 A1* | 1/2014 | Fuldseth | H04N 19/176 375/240.16 |
| 2014/0241439 A1* | 8/2014 | Samuelsson | H04N 19/70 375/240.26 |

FOREIGN PATENT DOCUMENTS

| | | |
|---|---|---|
| JP | 2011-124950 | 6/2011 |
| WO | 2008/127536 | 10/2008 |

OTHER PUBLICATIONS

ISO/IEC 14496-10 "MPEG-4 Part 10 Advanced Video Coding", Second edition 2004.
European Search Report dated Jun. 25, 2015 in European patent application No. 13816103.9.
Dong Tian et al: "On the calculation of MaxDpbFrames", 92. MPEG Meeting; Apr. 19, 2010-Apr. 23, 2010; Dresden; (Motion Picture Expert Group or ISO/IEC JTC1/SC29/WG11 ), No. M17542, Apr. 26, 2010 (Apr. 26, 2010), XP030046132.
A Vetro et al: "Overview of the Stereo and Multiview Video Coding Extensions of the H.264/MPEG-4 AVC Standard", Proceedings of the IEEE, vol. 99, No. 4, Apr. 1, 2011 (Apr. 1, 2011), pp. 626-642, XP055132298, ISSN: 0018-9219, DOI: 10.1109/JPROC.2010. 2098830, p. 635, right-hand column, paragraph 2.
Anonymous: "Meeting report of the 30th JVT meeting", 30. JVT Meeting; Jan. 29, 2009-Feb. 2, 2009; Geneva, ; Joint Video Team OFISO/IEC JTC1/SC29/WG11 and ITU-T SG.16) No. JVT-AD200, Jul. 7, 2009 (Jul. 7, 2009), XP030007460, ISSN: 0000-0079, pp. 19 and 20.
Fujibayashi A et al: "MaxDpbSize setting based on the picture size", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL:http://wftp3. itu.int/av-arch/jctvc-site/ ,, No. JCTVC-J0210, Jul. 2, 2012 (Jul. 2, 2012), XP030112572, pp. 1-2.
Anonymous: "Text of ISO/IEC 14496-10:200X/FPDAM 1 Multiview Video Coding", 83. MPEG Meeting; Jan. 14, 2008-Jan. 18, 2008; Antalya; (Motion Picture Expert Group or ISO/IEC JTC1/SC29/WG11) No. N9576, Feb. 28, 2008 (Feb. 28, 2008), XP030016070, ISSN: 0000-0023 pp. 26-32.

* cited by examiner

FIG. 2

| Level identifier | Maximum number of per-picture pixels (MaxLumaFS) [The number of pixels] | Maximum buffer size (MaxDPBSize) [The number of pictures] |
|---|---|---|
| 1 | 36864 | 6 |
| 2 | 12880 | 6 |
| 3 | 458752 | 6 |
| 3.1 | 983040 | 6 |
| 4 | 2088960 | 6 |
| 4.1 | 2088960 | 6 |
| 4.2 | 2228224 | 6 |
| 4.3 | 2228224 | 6 |
| 5 | 8912896 | 6 |
| 5.1 | 8912896 | 6 |
| 5.2 | 8912896 | 6 |
| 6 | 33423360 | 6 |

FIG. 8

| Level identifier | Maximum number of per-picture pixels (MaxLumaFS) [The number of pixels] | Maximum buffer size (MaxDPBSize) [The number of pictures] | mvcScaleFactor |
|---|---|---|---|
| 1 | 36864 | 6 | 2 |
| 2 | 12880 | 6 | 2 |
| 3 | 458752 | 6 | 2 |
| 3.1 | 983040 | 6 | 2 |
| 4 | 2088960 | 6 | 3 |
| 4.1 | 2088960 | 6 | 3 |
| 4.2 | 2228224 | 6 | 3 |
| 4.3 | 2228224 | 6 | 4 |
| 5 | 8912896 | 6 | 4 |
| 5.1 | 8912896 | 6 | 4 |
| 5.2 | 8912896 | 6 | 4 |
| 6 | 33423360 | 6 | 4 |

FIG. 17

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 20
Stream of TS packets
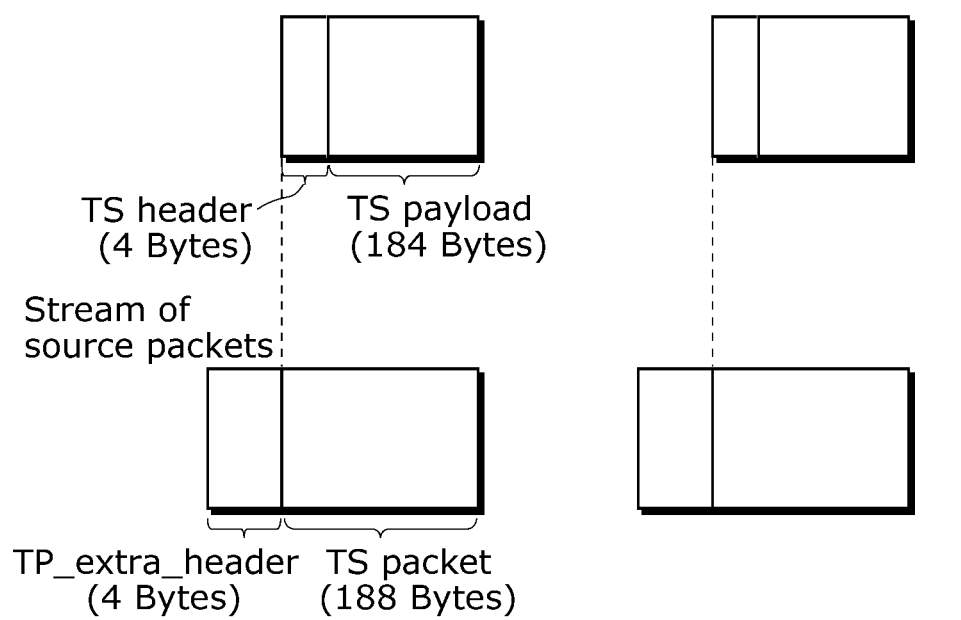
TS header  TS payload
(4 Bytes)  (184 Bytes)
Stream of
source packets
TP_extra_header  TS packet
(4 Bytes)        (188 Bytes)
Multiplexed data
SPN 0 1 2 3 4 5 6 7  ...
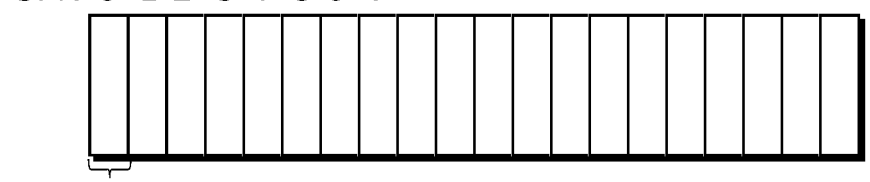
Source packet FIG. 28
| Corresponding standard | Driving frequency |
|---|---|
| MPEG-4 AVC | 500 MHz |
| MPEG-2 | 350 MHz |
| ... | ... |
FIG. 29A
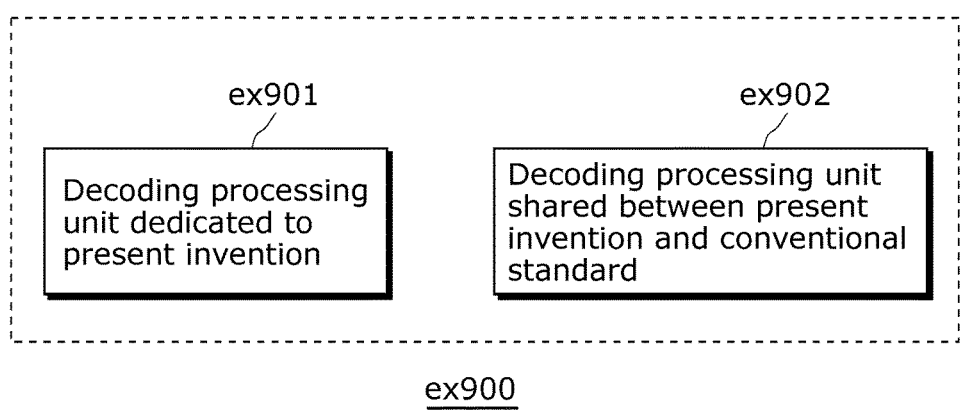
FIG. 29B
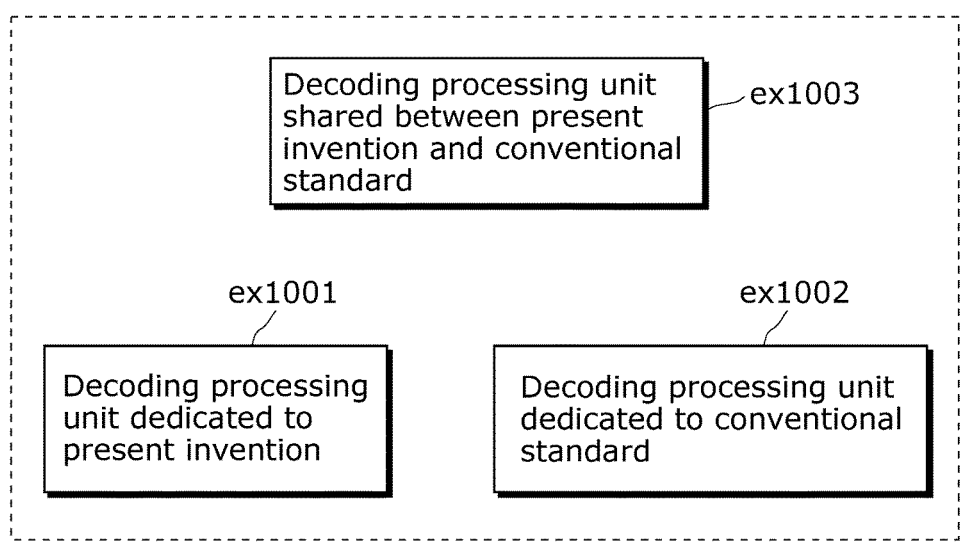

IMAGE ENCODING METHOD, IMAGE DECODING METHOD, IMAGE ENCODING DEVICE, AND IMAGE DECODING DEVICE

TECHNICAL FIELD

The present invention relates to an image encoding method and an image decoding method.

BACKGROUND ART

A video includes a plurality of pictures, and each of the pictures includes a predetermined number of pixels. The video is encoded on a per picture basis, and each picture is encoded on a basis of a block obtained by dividing the picture.

In general video coding, the amount of information is compressed by reducing redundancy in temporal and spatial directions.

In inter-picture predictive coding for reducing temporal redundancy, prediction information is generated by performing motion estimation and motion compensation on a current picture to be encoded with reference to a picture temporally preceding or succeeding the current picture to be encoded, and a difference between the prediction information and the current picture is encoded. Here, the picture temporally preceding the current picture to be encoded is a picture (forward picture) having a display time earlier than that of the current picture to be encoded, and the picture temporally preceding the current picture to be encoded is the picture (backward picture) having a display time later than that of the current picture to be encoded.

In the MPEG-4 AVC/H.264 method (hereinafter referred to as the H.264 method) defined in the ISO/IEC 14496-10 Advanced Video Coding (AVC) that is one of image encoding methods (video encoding methods), it is possible to perform motion compensation on a current picture to be encoded with reference to arbitrary two pictures temporally preceding or succeeding the current picture to be encoded that is a target to be encoded (for example, see Non-patent Literature 1). For this reason, when inter-picture predictive encoding and inter-picture predictive decoding are performed in the H.264 method, there is a need to store all of the forward and backward pictures which may be referred to (hereinafter referred to as candidate reference pictures).

NON PATENT LITERATURE

[NPL 1]
ISO/IEC 14496-10 "MPEG-4 Part 10 Advanced Video Coding"

SUMMARY OF INVENTION

Technical Problem

However, these image encoding method and image decoding method are desired to be modified to allow efficient use of memory areas in picture memories. In addition, in multiview video coding (MVC), inter-view reference is performed, and thus control of these picture memories become more complex.

The present invention has an object to provide an image encoding method for performing multiview video encoding or an image decoding method for performing multiview video decoding, either of which allows efficient use of a memory area.

Solution to Problem

An image encoding method according to an aspect of the present invention is an image encoding method for encoding a multiview video includes: determining a maximum number of per-picture pixels and a maximum number of candidate reference images which is used in non-multiview coding, from a level signal indicating a coding level with reference to a table indicating a relationship between (i) the coding level, and (ii-i) a maximum number of candidate reference images for non-multiview coding and (ii-ii) a maximum number of per-picture pixels, the maximum number of per-picture pixels indicating a maximum number of pixels per picture and being processable by an image encoding device and an image decoding device; calculating a maximum number of candidate reference views for inter-view predictive coding, using the maximum number of per-picture pixels, an image size of an input image, and a scale factor for multiview video coding; and calculating a maximum number of candidate reference images for multiview video coding, using the maximum number of candidate reference views and the maximum number of candidate reference images for non-multiview coding.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

The present invention provides an image encoding method for performing multiview video encoding or an image decoding method for performing multiview video decoding, either of which allows efficient use of a memory area.

BRIEF DESCRIPTION OF DRAWINGS

FIG. 2 is a diagram illustrating an example of an association table indicating associations each between (i) a level identifier, and (ii-i) a maximum number of per-picture pixels and (ii-ii) a maximum buffer size.

FIG. 8 is a diagram illustrating an example of an association table indicating associations each between (i) a level identifier, and (ii-i) a maximum number of per-picture pixels and (ii-ii) a maximum buffer size, and (iii) a scale factor.

FIG. 17 illustrates a structure of multiplexed data.

FIG. 20 shows a structure of TS packets and source packets in the multiplexed data.

FIG. 28 shows an example of a look-up table in which video data standards are associated with driving frequencies.

FIG. 29A is a diagram showing an example of a configuration for sharing a module of a signal processing unit.

FIG. 29B is a diagram showing another example of a configuration for sharing a module of the signal processing unit.

DESCRIPTION OF EMBODIMENTS

Underlying Knowledge Forming Basis of the Present Disclosure

The Inventors found that the image encoding method and the image decoding method described in the Background Art section cause problems below.

In the H.264 method, a picture to be referred to (a reference picture) in inter-picture predictive encoding or inter-picture predictive decoding is selected on a basis of a block in a current picture to be encoded or decoded from among a plurality of pictures processed and stored in a picture memory. For example, when the current picture is a B-picture for which at most two pictures can be referred to, at most two pictures selected from among a plurality of pictures processed and stored in the picture memory are used as reference pictures. In addition, when the current picture is a P-picture for which only a single picture can be referred to, a single picture selected from among a plurality of pictures processed and stored in the picture memory is used as a reference picture.

In other words, in the H.264 method, each candidate reference picture is one of the processed pictures whose image data is stored in the picture memory, irrespective of whether the current picture is a P-picture or a B-picture. Here, since each reference picture is selected on the basis of the block in the current picture, the number of reference pictures may amount to a considerable number irrespective of whether the current picture is a P-picture or a B-picture when considered on a per picture basis. Stated differently, a maximum number of reference pictures selected for each current picture is equal to the number of candidate reference pictures selected for the current picture.

Figure 1:
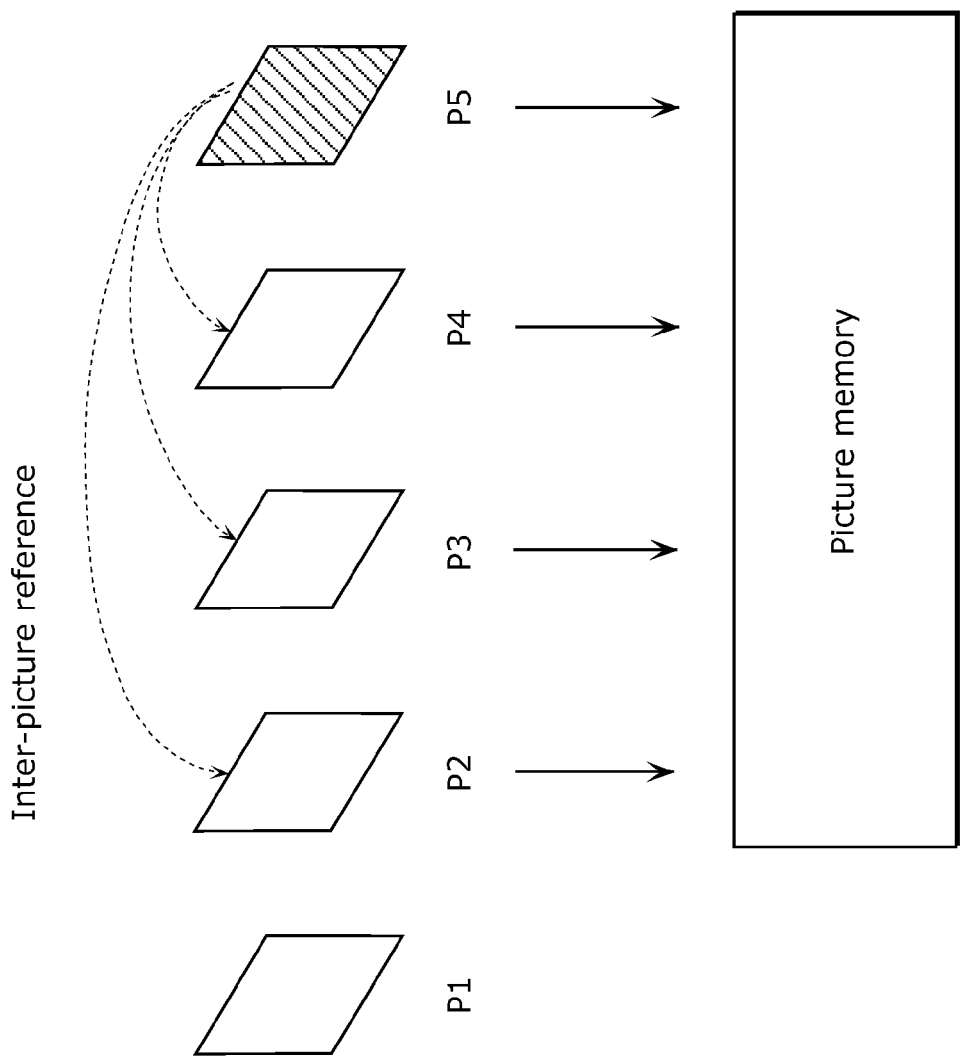
FIG. 1 is a diagram for explaining management of a picture memory.

FIG. 1 is a diagram for explaining management of a picture memory conforming to the H.264 method. In this example, the number of pictures which can be stored in the picture memory is four. In other words, the candidate reference pictures which may be referred to are the three pictures obtained by excluding the single current picture to be processed from these four pictures.

For example, as illustrated in FIG. 1, when Picture P5 that is a current picture to be processed is subject to inter-picture predictive encoding or inter-picture predictive decoding, the candidate reference pictures are Pictures P2 to P4 whose image data is stored in the picture memory. Here, Pictures P1 to P5 are arranged in encoding order (decoding order), and respective Pictures P1 to P5 are encoded or decoded in this order.

In addition, in the image decoding device, even when a decoded picture is a decoded picture other than any candidate reference picture to be referred to in inter-picture decoding on a current picture (in short, the decoded picture is not used as a reference picture), the image data of the decoded picture as a picture to be displayed needs to be stored in the picture memory until the decoded picture is displayed according to a display order. In other words, in picture memory management, pictures to be displayed need to be considered, and an area obtained by subtracting an area for the number of pictures to be displayed from a memory area of the picture memory is an area available for the candidate reference pictures. To simplify the following explanation, the explanation is given of a bitstream (IPP-PIPPPIPPP . . . ) made only of intra pictures and P-pictures which do not require pictures to be displayed. This eliminates the need to consider pictures to be displayed. It is to be noted that these embodiments described below are applicable to a bitstream including a picture to be displayed, and a description given without considering a picture to be displayed should not be interpreted as a description limited to a bitstream with no picture to be displayed.

As described above, the number of pictures (reference pictures) referred to in encoding or decoding of each picture is one or two at most. However, reference pictures vary for each block of a current picture to be encoded, and thus there is a need to store all of the decoded pictures (candidate reference pictures) which may be referred to for any block of the current picture to be encoded.

Here, if the image encoding device is configured to be able to set the number of candidate reference pictures freely, it is impossible to determine the capacity of a memory area of the picture memory that should be mounted on the image decoding device. In view of this, in the H.264 method, a limitation is placed on a maximum number of candidate reference pictures to be used in inter-picture predictive encoding and inter-picture predictive decoding according to a coding level. In this way, the image decoding device can know in advance the capacity of the memory area of the picture memory that should be mounted on the image decoding device.

More specifically, in the standard document, a value (MaxDpbMbs) indicating the value of the capacity of the memory area to be required (the memory capacity of the picture memory that should be mounted) is determined in advance according to the coding level. Here, more specifically, MaxDpbMbs denotes the number of blocks (macroblocks) as indicating the capacity of the reserved memory area. An image decoding device which supports a particular coding level (an image decoding device capable of decoding a bitstream encoded to satisfy the particular coding level) needs to mount a picture memory having a memory capacity specified by the standard document. By mounting the picture memory having the memory capacity specified by the standard document onto the image decoding device, it is guaranteed that the image decoding device is capable of decoding encoded data belonging to the coding level without causing any problem. In short, the image decoding device conforming to the H.264 method includes the picture memory having the capacity for storing blocks (macroblocks) the number of which is specified by the MaxDpbMbs.

In the H.264 method, a maximum number of candidate reference pictures (MaxDppFrames) is calculated according to the mathematical expression (Expression 1) below.

MaxDpbFrames=Min(MaxDpbMbs/
(PicWidthInMbs*FrameHeightInMbs),16)     (Expression 1)

Here, PicWidthinMbs and FrameHeightInMbs are values indicating the number of macroblocks as respectively indicating the width and height of the current picture to be encoded. As is clear from the mathematical expression (Expression 1), the upper limit value for the MaxDpbFrames is 16, but the value of MaxDpbFrames is variable depending on the size of a current picture to be encoded. For example, the value of MaxDpbFrames is a small number when the size of the current picture to be encoded is large, and the value of MaxDpbFrames is a large number when the size of the current picture to be encoded is small.

The image encoding device according to the H.264 method performs inter-picture predictive coding within a range not exceeding the maximum number of candidate reference pictures (MaxDpbFrames), includes, in encoded data, the number of candidate reference pictures (max_dec_frame_buffering) for use in actual encoding, and notifies the image decoding device of the encoded data. The image decoding device includes the picture memory having the memory capacity specified by MaxDpbMbs, and reserves, for decoding of encoded data, an area (picture buffer) for the encoded data having the picture size corresponding to the number of candidate reference images specified by max_dec_frame_buffering (≤MaxDpbFrames) included in the encoded data.

The image decoding device may be implemented as hardware, and thus the memory capacity of the picture memory that should be mounted on the image decoding device needs to be determined in advance. In the H.264 method, by setting a maximum number of candidate reference pictures (MaxDpbFrames) as a variable value corresponding to the picture size of encoded data, it is possible to use a memory area efficiently and accelerate high-resolution coding.

Meanwhile, in the High Efficiency video Coding (hereinafter referred to as the HEVC method) which is an image encoding method which has been currently standardized, the memory capacity of a picture memory that should be mounted on an image decoding device is determined in advance. However, since the maximum number of candidate reference pictures (maximum buffer size: MaxDpbSize) is fixed, it is impossible to use the memory area efficiently according to the picture size of the encoded data.

Hereinafter, a problem is explained specifically. FIG. 2 is a table T1 indicating associations each between (i) a value of a level identifier, and (ii-i) a maximum number of per-picture pixels (MaxLumaFS) and (ii-ii) a maximum number of candidate reference pictures (maximum buffer size: MaxDpbSize).

For the coding level identified by a level identifier, a maximum number of per-picture pixels (MaxLumaFS) and a maximum buffer size (MaxDPBSize) which are unique are set. For example, in the table T1, twelve coding levels are indicated, and each coding level corresponds to one of values (1) to (6) of level identifiers. In addition, each of the values (1) to (6) of the level identifiers is associated with a specific numerical value of a maximum number of per-picture pixels (MaxLumaFS) and a specific numerical value of a maximum buffer size (MaxDPBSize).

In addition, the maximum number of per-picture pixels (MaxLumaFS) can be encoded by the image encoding device, and denotes a maximum input image (video) size which can be decoded by the image decoding device which decodes the encoded data. In short, the maximum number of per-picture pixels denotes a possible maximum value for a value as a product of the number of pixels high (h) and the number of pixels wide (w) of an input image.

According to the coding level, the value of a maximum number of storable pixels (a memory capacity of a picture memory that should be mounted on the image decoding device) can be calculated according to the following mathematical expression (Expression 2).

The number of storable
pixels=MaxDpbSize*MaxLumaFS     (Expression 2)

Accordingly, as in the H.264 method, the memory capacity of the picture memory that should be mounted on the image decoding device is defined according to the coding level, and thus the image decoding device can know in advance the memory capacity of the picture memory that should be mounted thereon. However, unlike the H.264 method, the maximum number of candidate reference pictures (MaxDpbSize) is defined as a fixed value (6) in the table T1, and thus it is impossible to use the memory area efficiently.

The influence of inefficient memory management is more noticeable when performing multiview video coding (MVC).

The following embodiments describe an image encoding method and an image decoding method which allow efficient use of memory areas according to the picture size of encoded data particularly in the case of performing multiview video coding (MVC). In addition, an image encoding device and an image decoding device which use the memory areas efficiently according to the picture size of encoded data are explained.

An image encoding method according to an aspect of the present invention is an image encoding method for encoding a multiview video includes: determining a maximum number of per-picture pixels and a maximum number of candidate reference images which is used in non-multiview coding, from a level signal indicating a coding level with reference to a table indicating a relationship between (i) the coding level, and (ii-i) a maximum number of candidate reference images for non-multiview coding and (ii-ii) a maximum number of per-picture pixels, the maximum number of per-picture pixels indicating a maximum number of pixels per picture and being processable by an image encoding device and an image decoding device; calculating a maximum number of candidate reference views for inter-view predictive coding, using the maximum number of per-picture pixels, an image size of an input image, and a scale factor for multiview video coding; and calculating a maximum number of candidate reference images for multiview video coding, using the maximum number of candidate reference views and the maximum number of candidate reference images for non-multiview coding.

In this way, the image encoding method makes it possible to calculate appropriately the maximum number of candidate reference pictures (candidate reference views) in the multiview video coding. In addition, the image encoding method makes it possible to vary the number of candidate reference pictures in inter-picture prediction or the number of candidate reference views in inter-view prediction according to the image size of the input image. In this way, the image encoding method makes it possible to use the memory area efficiently.

For example, in the calculating of a maximum number of candidate reference views, the maximum number of candidate reference views may be calculated according to a mathematical expression below: MaxView=Floor(mvcScaleFactor*MaxLumaFS/(PicHeight*PicWidth)), where MaxView represents the candidate reference view, mvcScaleFactor represents the scale factor, and MaxLumaFs represents the maximum number of per-picture pixels.

In this way, the image encoding method makes it possible to calculate the maximum number of candidate reference views appropriately.

For example, in the calculating of a maximum number of candidate reference images for multiview video coding, the maximum number of candidate reference images for multiview video coding may be calculated according to a mathematical expression below: MvcMaxDPBSize=MaxView*MaxDPBSize, where MvcMaxDPBSize represents the maximum number of candidate reference images for multiview video coding, and MaxDPBSize represents the maximum number of candidate reference images for non-multiview coding.

In this way, the image encoding method makes it possible to calculate the maximum number of candidate reference pictures for use in the multiview video coding appropriately.

For example, the image encoding method may further include setting the number of candidate reference images for multiview video coding to be stored in a decoded picture buffer within a range not exceeding the maximum number of candidate reference images for multiview video coding.

In this way, the image encoding method makes it possible to calculate the maximum number of candidate reference images for use in the multiview video coding appropriately.

Furthermore, an image decoding method according to an aspect of the present invention is an image decoding method for decoding data encoded using a multiview video coding method includes: obtaining, from the data, the number of candidate reference images for multiview video coding and an image size; and reserving, in the decoded picture buffer, a picture area for storing the encoded data having the image size corresponding to the number of candidate reference images for multiview video coding.

In this way, the image decoding method makes it possible to use the memory area efficiently.

For example, the number of candidate reference images for multiview video coding included in the data may be set through the following steps: determining a maximum number of per-picture pixels and a maximum number of candidate reference images which is used in non-multiview coding, from a level signal indicating a coding level with reference to a table indicating a relationship between (i) the coding level, and (ii-i) a maximum number of candidate reference images for non-multiview coding and (ii-ii) a maximum number of per-picture pixels, the maximum number of per-picture pixels indicating a maximum number of pixels per picture and being processable by an image encoding device and an image decoding device; calculating a maximum number of candidate reference views for inter-view predictive coding, using the maximum number of per-picture pixels, an image size of an input image, and a scale factor for multiview video coding; calculating a maximum number of candidate reference images for multiview video coding, using the maximum number of candidate reference views and the maximum number of candidate reference images for non-multiview coding; and setting the number of candidate reference images for multiview video coding to be stored in a decoded picture buffer within a range not exceeding the maximum number of candidate reference images for multiview video coding.

In this way, the image decoding method makes it possible to decode the data of candidate reference views for use in inter-view prediction and whose number is appropriately set.

In addition, an image encoding device according to an aspect of the present invention is an image encoding device for encoding a multiview video, includes: processing circuitry; storage accessible from the processing circuitry, wherein the processing circuitry executes, using the storage, the following steps: determining a maximum number of per-picture pixels and a maximum number of candidate reference images which is used in non-multiview coding, from a level signal indicating a coding level with reference to a table indicating a relationship between (i) the coding level, and (ii-i) a maximum number of candidate reference images for non-multiview coding and (ii-ii) a maximum number of per-picture pixels, the maximum number of per-picture pixels indicating a maximum number of pixels per picture and being processable by an image encoding device and an image decoding device; calculating a maximum number of candidate reference views for inter-view predictive coding, using the maximum number of per-picture pixels, an image size of an input image, and a scale factor for multiview video coding; and calculating a maximum number of candidate reference images for multiview video coding, using the maximum number of candidate reference views and the maximum number of candidate reference images for non-multiview coding.

In this way, the image encoding device is capable of calculating the maximum number of candidate reference pictures (candidate reference views) for use in multiview video coding appropriately. In addition, the image encoding device is capable of varying the number of candidate reference pictures for use in inter-picture prediction or the number of candidate reference pictures for use in inter-view prediction according to the image size of the input image. In this way, the image encoding device is capable of using the memory area efficiently.

In addition, an image decoding device according to an aspect of the present invention is an image decoding apparatus which decodes data encoded using a multiview video coding method includes: processing circuitry; and storage accessible from the processing circuitry, wherein the processing circuitry executes, using the storage, the following steps: obtaining, from the data, the number of candidate reference images for multiview video coding and an image size; and reserving, in the decoded picture buffer, a picture area for storing the encoded data having the image size corresponding to the number of candidate reference images for multiview video coding.

In this way, the image decoding device is capable of using the memory area efficiently.

In addition, the image encoding and decoding device according to an aspect of the present invention may include the image encoding device and the image decoding device.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments of the present invention are described in detail with reference to the drawings.

Each of the embodiments described below indicates a specific example according to the present invention. The numerical values, shapes, materials, constituent elements, the arrangement and connection of the constituent elements, steps, the processing order of the steps etc. shown in the following exemplary embodiments are mere examples, and therefore do not limit the scope of the present invention. Therefore, among the constituent elements in the following exemplary embodiments, constituent elements not recited in any one of the independent claims that indicate the most generic inventive concept are described as arbitrary constituent elements.

Embodiment 1

Figure 3:
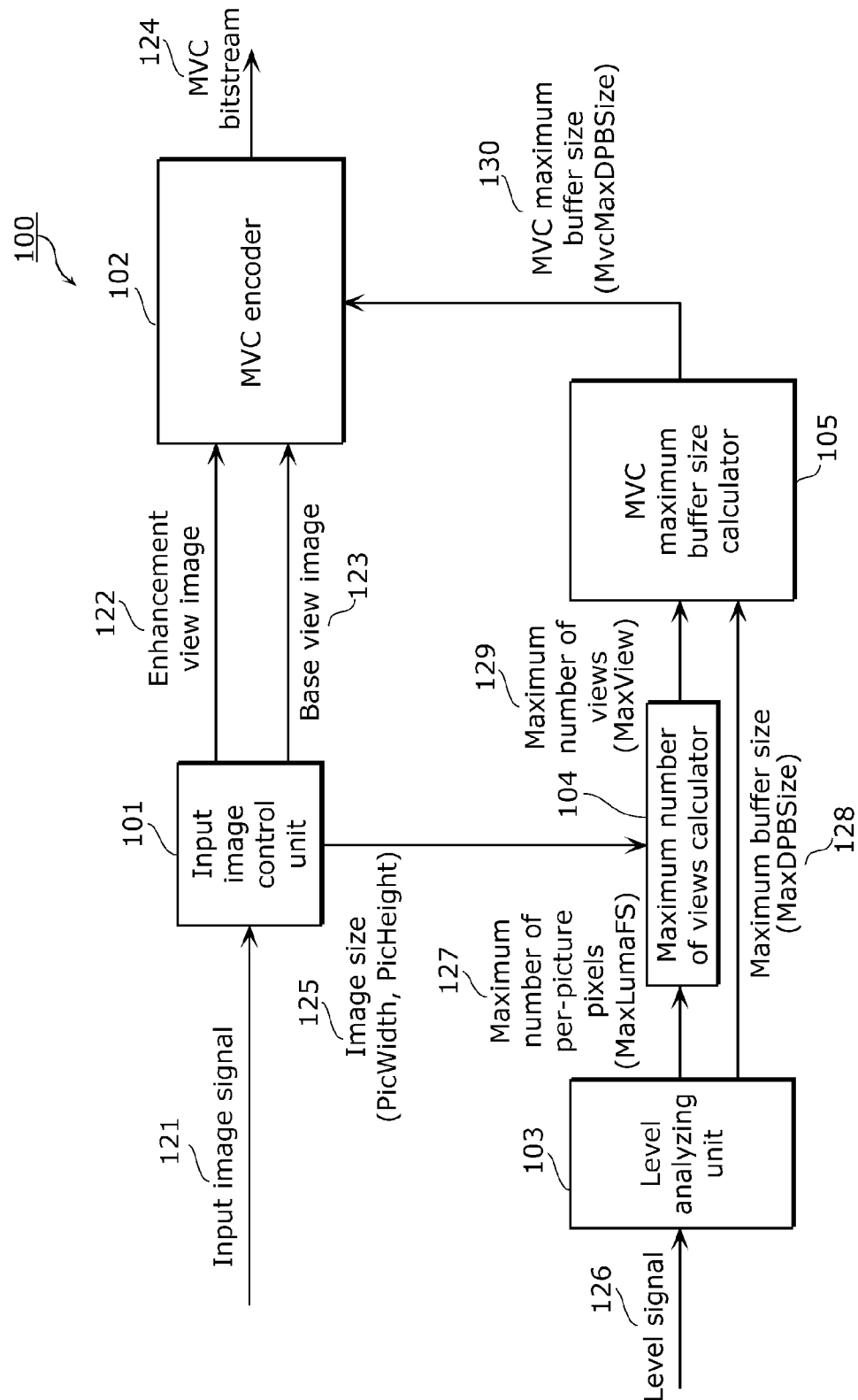
FIG. 3 is a block diagram of an image encoding device according to Embodiment 1.

FIG. 3 is a block diagram illustrating a configuration of an image encoding device (video encoding device) including a multiview video coding (MVC) encoder according to this embodiment.

The image encoding device 100 illustrated in FIG. 3 includes: an input image control unit 101; the MVC encoder 102; a level analyzing unit 103; a maximum number of views calculator 104; and an MVC maximum buffer size calculator 105.

The input image control unit 101 stores, for each view, an input image signal 121 input on a per picture basis, and transmits an enhancement view image 122 and a base view image 123 which have been stored onto an encoding unit which encodes each view inside the MVC encoder 102. In addition, the input image control unit 101 outputs information (image size 125) indicating the size of an input image to the maximum number of views calculator 104. The image size 125 includes information (PicHeight) indicating the number of pixels high of the input image and information (PicWidth) indicating the number of pixels wide of the input image.

The MVC encoder 102 performs multiview video coding on the enhancement view image 122 and the base view image 123 which have been input, to generate an MVC bitstream 124.

The level analyzing unit 103 determines a maximum number of per-picture pixels 127 (MaxLumaFS) that is information indicating the maximum number of pixels within a picture which can be encoded and a maximum buffer size 128 (MaxDpbSize) indicating the maximum number of candidate reference pictures, based on a signal (level signal 126) of a level identifier indicating a coding level and input through a user operation. It should be noted that this level analyzing unit 103 includes information of the table T1 illustrated in FIG. 2.

The maximum number of views calculator 104 calculates a maximum number of views 129 (MaxView) based on the maximum number of per-picture pixels 127 output from the level analyzing unit 103, the image size 125 output from the input image control unit 101, and a scale factor (mvcScaleFactor) for use in multiview video coding. It should be noted that the maximum number of views calculator 104 includes a value for mvcScaleFactor in advance. Thus, the scale factor is a predetermined coefficient.

The MVC maximum buffer size calculator 105 calculates an MVC maximum buffer size 130 (a maximum buffer size for use in multiview video coding: MvcMaxDpbSize) indicating a maximum number of candidate reference pictures for use in multiview video coding, based on the maximum buffer size 128 (MaxDpbSize) output from the level analyzing unit 103 and the maximum number of views 129 (MaxView) output from the maximum number of views calculator 104. The MVC maximum buffer size calculator 105 then outputs the calculated MVC maximum buffer size 130 to the MVC encoder 102. The MvcMaxDpbSize is a value indicating a maximum number of decoded pictures stored in the picture buffer (decoded picture buffer: DPB) when inter-picture predictive coding or inter-picture predictive decoding is performed on a current picture to be encoded (current view to be encoded) of a given view.

The maximum number of views calculator 104 and the MVC maximum buffer size calculator 105 may calculate and output the output data by actually calculating the numerical values based on the input data. Alternatively, the maximum number of views calculator 104 and the MVC maximum buffer size calculator 105 may store, in advance, a table indicating associations each between the value of representative input data and a value of output data corresponding thereto, and obtains the output data with reference to the table based on the value of the input data.

Figure 4:
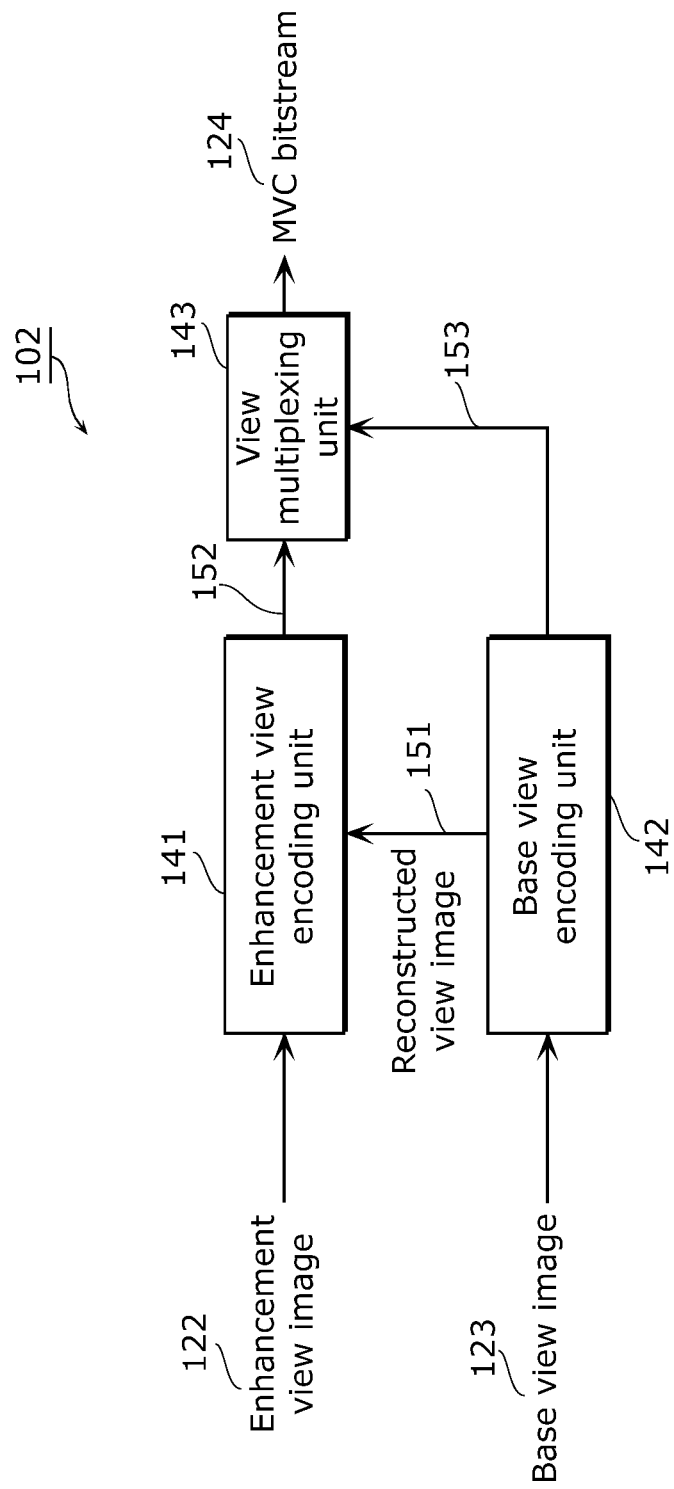
FIG. 4 is a block diagram of an MVC encoder according to Embodiment 1.

Next, the internal configuration of the MVC encoder 102 is explained. FIG. 4 is a block diagram illustrating a configuration of the MVC encoder 102.

As illustrated in FIG. 4, the MVC encoder 102 includes a base view encoding unit 142, an enhancement view encoding unit 141, and a view multiplexing unit 143.

The base view encoding unit 142 has functions similar to those of a normal image encoding device which does not perform multiview video coding, and generates a base view encoded signal 153 by encoding the base view image 123. The base view encoding unit 142 outputs, to the enhancement view encoding unit 141, a reconstructed view image 151 obtained by decoding the base view image 123 encoded inside the base view encoding unit 142.

The enhancement view encoding unit 141 encodes the enhancement view image 122 output from the input image control unit 101 using the reconstructed view image 151, to generate an enhancement view encoded signal 152. More specifically, the enhancement view encoding unit 141 selects, for each block of a current picture to be encoded (a current enhancement view image to be encoded), either inter-picture predictive coding using a reconstructed image of an already encoded enhancement view image or inter-view predictive coding using a reconstructed image (reconstructed view image 151) of the base view image 123, and encodes the enhancement view image 122.

The view multiplexing unit 143 multiplexes each view, i.e, a base view encoded signal 153 and an enhancement view encoded signal 152 which are encoded information of a base view and an enhancement view, to generate an MVC bitstream 124 that is a bitstream already encoded using multiview video coding.

Although the MVC encoder 102 illustrated in FIG. 4 encodes two views that are the base view and the enhancement view, it is possible to realize multiview video coding including two or more enhancement views by coupling such enhancement view encoding units 141 in multiple stages.

Figure 5:
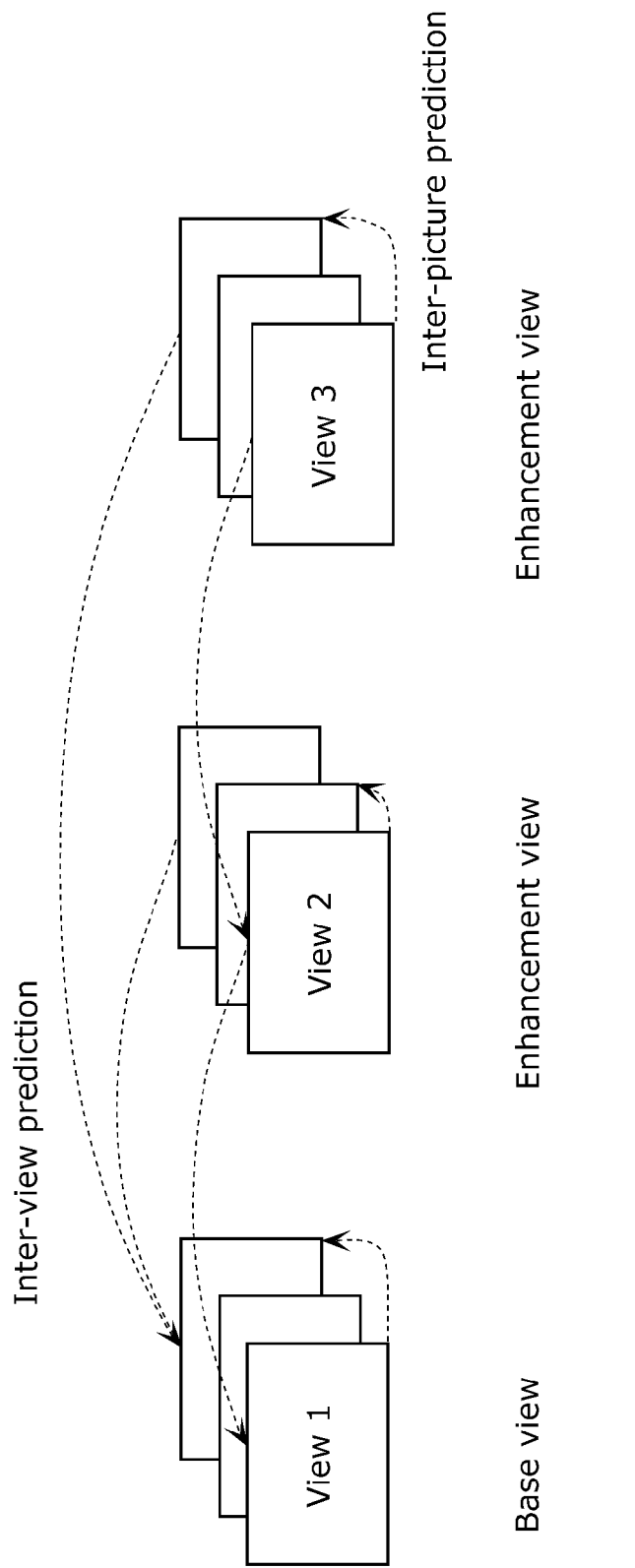
FIG. 5 is a diagram illustrating examples of input images of each of views according to Embodiment 1.

FIG. 5 illustrates an example of an input image of each view in the MVC encoder 102. This input image includes a single base view and two enhancement views. The base view (View 1) and the enhancement views (View 2 and View 3) have the same image resolution. In general, the respective views are images shot at the same point of time from slightly different points of view, and have a correlation therebetween. Thus, in encoding of a given one of the views, another view can be used as a prediction image. At present, the multiview video coding is used as an encoding method for a three-dimensional (3D) image.

The multiview video coding performs inter-picture prediction in encoding of an enhancement view using a reconstructed image of another view as a reference image, and thereby increases the encoding efficiency. Here, the use of a reconstructed image of one of the other views in encoding an enhancement view is referred to as inter-view reference (prediction). In the multiview video coding, the reconstructed image of the one of the other views is used as a reference image in inter-picture prediction (inter prediction) in temporal direction used in normal image coding. Here, it is impossible to use, as a reference image, a reconstructed image which is of one of the other views and is different in time from a current image to be encoded. The inter-view prediction and the inter-picture prediction (inter prediction) in the image encoding device differ only in the point of whether a reference image is a picture of a different view or a different-time picture of the same view, and the coding methods each involving either the inter-view prediction or the inter-picture prediction are intrinsically the same.

When inter-view prediction is used, a view to be referred to is selected. Dotted-line arrows in FIG. 5 each indicates a reference destination in inter-view prediction or inter-picture prediction. In the inter-view prediction of the enhancement view (View 2), the base view (View 1) is referred to. Meanwhile, in the inter-view prediction of the enhancement view (View 3), an enhancement view (View 2) is referred to. Whether inter-view prediction is performed or not is switched on a per block basis. Although an inter-view reference relationship (an encoding order) is determined, a different inter-view reference relationship is possible when time is different. More specifically, it is not allowed to refer to the enhancement view (View 3) when encoding the enhancement view (View 2) at a given point of time and refer to the enhancement view (View 2) when encoding the enhancement view (View 3) at the same point of time, but it is allowed to refer to the enhancement view (View 3) when encoding the enhancement view (View 2) at a given point of time and refer to the enhancement view (View 2) when encoding the enhancement view (View 3) at a different point of time.

Figure 6:
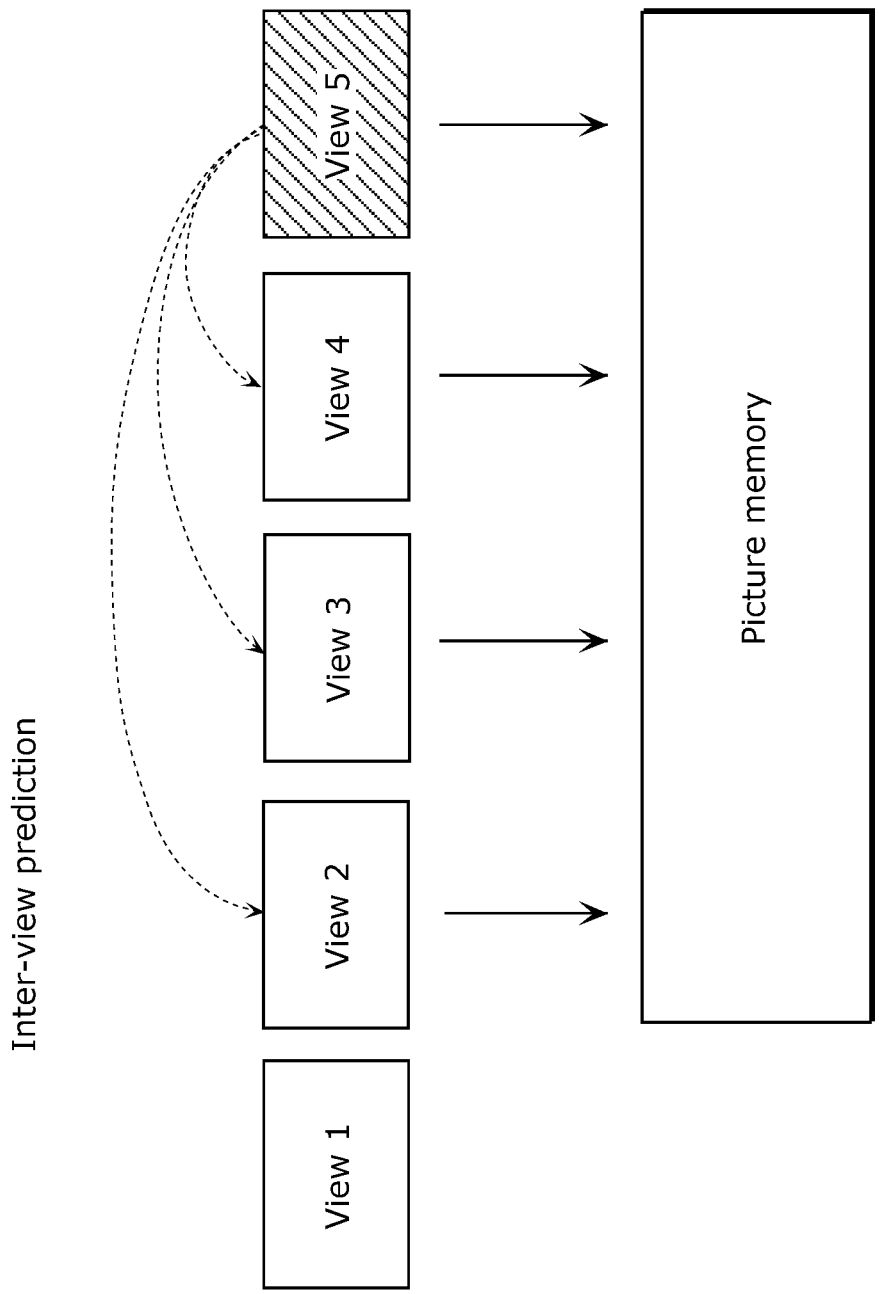
FIG. 6 is a diagram for explaining management of a picture memory corresponding to multiview video coding according to Embodiment 1.

FIG. 6 is a diagram for explaining specific management of a picture memory conforming to the multiview video coding. Although inter-picture prediction can be naturally selected when encoding each view as explained in FIG. 5, FIG. 6 illustrates a case where only inter-view prediction is selected, to simplify the explanation. In other words, it is assumed here that the MVC encoder 102 uses only inter-view prediction. FIG. 6 illustrates a case where the number of pictures (views) whose image data can be stored in the picture memory is four. In other words, in this case, the candidate reference views which may be referred to are the three pictures (views) obtained by subtracting a single picture (view) that is a current picture to be encoded from the four pictures (views).

For example, when View 5 is subject to inter-picture predictive encoding or inter-view predictive decoding as a current picture to be processed as illustrated in FIG. 6, candidate reference views are View 2 to View 4 whose image data is stored in the picture memory.

In this way, reference views vary for each block of the current picture to be encoded, and thus there is a need to store all of the decoded views (candidate reference views) which may be referred to for any block of the current picture to be encoded. Naturally, a candidate reference view needs to be a view which can be referred to for a current picture to be encoded according to an inter-view reference relationship.

Here, if the image encoding device is configured to be able to set the number of candidate reference views freely, it is impossible to determine the capacity of a memory area of the picture memory that should be mounted on the image decoding device. In view of this, there is a need to place a limitation on a maximum number of candidate reference views (MaxView) for use in inter-view predictive encoding and inter-view predictive decoding. It is conceivable that a given value is determined in advance and used as a maximum number of candidate reference views (MaxView). Here, the number of views which can be actually used in multiview video coding is 1024 at most. Thus, fixing a maximum number of candidate reference views (MaxView) causes a problem that some part of a memory is not utilized when the number of views to be actually used in multiview video coding is small. On the other hand, increasing the number of views to be actually used in multiview video coding reduces the number of candidate reference views, which causes a problem that it is impossible to perform high-resolution coding.

In the explanation of management of the picture memory in FIG. 6, to simplify the explanation, it is assumed that the MVC encoder 102 selects only inter-view prediction. In actual multiview video coding, either inter-view predictive coding using candidate reference views or inter-picture predictive (inter predictive) using candidate reference pictures is selected for each block of a current picture to be encoded, and the selected predictive coding is performed.

Accordingly, there is a need to appropriately calculate the MVC maximum buffer size 130 (a maximum buffer size in multivew video coding: MvcMaxDpbSize) indicating a maximum number of candidate reference pictures for use in multiview video coding. Also in multivew video coding, the memory capacity of the picture memory that should be mounted on the image decoding device needs to be determined in advance. An object of this embodiment is to increase the maximum number of candidate reference pictures and thereby enabling high-resolution coding, using limited resources. Here, candidate reference pictures for use in multiview video coding include candidate reference views in inter-view predictive coding and candidate reference pictures in inter-picture prediction (inter prediction) coding. Here, an image size of a picture and an image size of a view are the same.

The image encoding method in this embodiment is intended to determine MvcMaxDpbSize that allows efficient use of a memory area according to the picture size of encoded data when performing multiview video coding (MVC).

Hereinafter, how to determine MvcMaxDpbSize is explained together with explanation of operations performed by the image encoding device 100.

Figure 7:
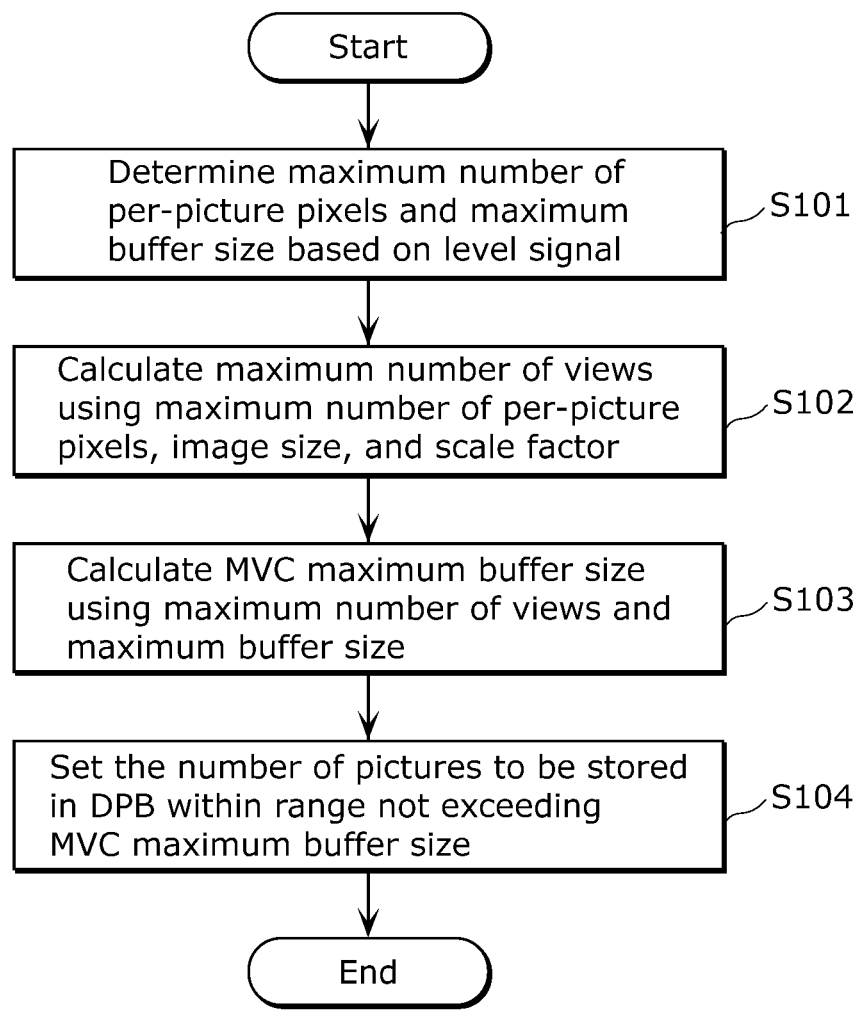
FIG. 7 is a flowchart of image encoding processes according to Embodiment 1.

FIG. 7 is a flowchart of image encoding processes performed by the image encoding device 100 according to this embodiment.

In the image encoding device 100 according to this embodiment, prior to encoding of an input image, a coding level for use as an encoding condition is selected from among a plurality of coding levels which have been defined in advance, based on the configurations of a memory etc. of the image encoding device 100 and the configurations of a memory etc. of an image decoding device which may decode the encoded data. More specifically, the selection of the coding level is made by a user with reference to the table T1, and a level signal 126 indicating a level identifier corresponding to the selected level is input to the level analyzing unit 103 through a user operation.

Although the table T1 does not explicitly indicate a maximum number of storable pixels (the memory capacity of the picture memory that should be mounted), it is possible to obtain a value of the maximum number of storable pixels required for the coding level, based on the mathematical expression (Expression 2) when performing normal encoding rather than multiview video coding. When performing multiview video coding, as illustrated in a mathematical expression (Expression 3), the value obtained by multiplying the value of the maximum number of storable pixels obtained according to the mathematical expression (Expression 2) with a scale factor (mvcScaleFactor) for use in multiview video coding is the maximum number of storable pixels for use in multiview video coding. In 3D coding, a two-decoder configuration of a decoder which decodes a right-eye image and a decoder which decodes a left-eye image is often employed, and 2 is generally used as the value of mvcScaleFactor.

$$\text{The maximum number of storable pixels(at the time of multiview video coding)} = \text{mvcScaleFactor} * (\text{MaxDpbSize} * \text{MaxLumaFS}) \quad \text{(Expression 3)}$$

The maximum number of storable pixels indicates how much image data corresponding to how many pixels needs to be stored in the picture memory of the image decoding device corresponding to the image encoding device 100. In other words, the maximum number of storable pixels indicates the number of pixels corresponding to the maximum amount of image data which can be stored in the picture memory. For example, candidate reference pictures, decoded pictures to be displayed, and data of pictures such as current pictures to be decoded are stored in the picture memory of the image decoding device which decodes the encoded bitstream from the image encoding device 100. The maximum number of storable pixels is a total number of pixels of these pictures.

In the image encoding device 100, when the coding level is selected through the user operation, the level signal 126 is input to the level analyzing unit 103. The level analyzing unit 103 determines a maximum number of per-picture pixels 127 (MaxLumaFS) and a maximum number of candidate reference pictures (a maximum buffer size 128: MaxDpbSize) according to a coding level represented by the level signal 126 and selected through the user, with reference to the table T1 stored inside (see FIG. 2) (S101). Here, the maximum buffer size 128 indicates a maximum number of candidate reference images in non-multiview coding (normal coding that is not multiview video coding). The maximum number of per-picture pixels 127 (MaxLumaFS) is input to the maximum number of views calculator 104, and the maximum buffer size 128 (MaxDpbSize) is input to the MVC maximum buffer size calculator 105.

When the image data of the input image signal 121 is input to the input image control unit 101 in display time order for each view, image data items corresponding to the respective pictures of a view are stored in a memory unit (not illustrated) in the input mage control unit 101. The stored image data items are output, from the memory unit, as either base view images 123 or enhancement view images 122 for each view to the MVC encoder 102 in encoding order. At this time, the image data items are output to the MVC encoder 102 for each of the blocks of the picture. Furthermore, the input image control unit 101 outputs information indicating the size of an input image (image size 125) to the maximum number of views calculator 104.

Here, the block size is variable, and various sizes of blocks may coexist in the picture. Coding processes by the image encoding device 100 are performed on a per block basis. The image size 125 includes information indicating the number of pixels high (PicHeight) of the input image and information indicating the number of pixels wide (PicWidth) of the input image.

The maximum number of views calculator 104 calculates a maximum number of candidate reference views (maximum number of views 129: MaxView) for use in inter-view predictive encoding and inter-view predictive decoding, according to a mathematical expression (Expression 4) based on the image size 125 output from the input image control unit 101 and the maximum number of per-picture pixels 127 (MaxLumaFS) output from the level analyzing unit 103 (S102).

$$\text{MaxView} = \text{Floor}(\text{mvcScaleFactor} * \text{MaxLumaFS}/(\text{PicHeight} * \text{PicWidth})) \quad \text{(Expression 4)}$$

Here, the maximum number of views 129 indicates the maximum number of candidate reference views. In other words, it is possible to use, in inter-view prediction, candidate reference views in number obtained by subtracting the number of current views to be encoded from the maximum number of views 129.

As is clear from the mathematical expression (Expression 4), the maximum number of views 129 (MaxView) is a value that varies depending on the image size 125. In other words, the maximum number of views 129 is a large value when the image size 125 is small, and is a small value when the image size 125 is large. The upper limit for the image size 125 is limited to the maximum number of per-picture pixels 127 (MaxLumaFS), and thus the maximum number of views 129 is a minimum number (mvsScaleFactor) when the image size 125 is equal to the maximum number of per-picture pixels 127 (MaxLumaFS). The maximum number of views 129 calculated by the maximum number of views calculator 104 is output to the MVC maximum buffer size calculator 105.

According to the mathematical expression (Expression 4), the maximum number of per-picture pixels 127 (MaxLumaFS) is divided by the image size 125 (PicHeight*PicWidth). It is intended here that the picture memory has an area for the maximum number of per-picture pixels 127 (MaxLumaFS) per picture, and thus a maximum number of storable input pictures corresponding to the maximum number of pixels are reserved. However, since division processing is complex or requires a large amount of calculation, the mathematical expression (Expression 4) may be substituted by the following mathematical expressions or logical expressions ((Expression 4a) and (Expression 4b)), using a predefined picture size (LumaFS).

$$\alpha=\text{Floor}(\text{MaxLumaFS}/\text{LumaFS})$$

$$\text{If}(\text{PicHeight}*\text{PicWidth} \leq \text{LumaFS})$$

$$\text{MaxView}=\text{mvcScaleFactor}*\text{MaxLumaFS}*\alpha \quad \text{(Expression 4a)}$$

Else $$\text{MaxView}=\text{mvcScaleFactor}*\text{MaxLumaFS} \quad \text{(Expression 4b)}$$

Here, α denotes a value which is determined in advance based on a predefined picture size (LumaFS), and the image encoding device and the image decoding device do not need to dynamically obtain the value. For example, α is 2 when the picture size (LumaFS) has a half size of the MaxLumaFS. In this case, when the image size 125 (PicHeight*PicWidth) is smaller than or equal to LumaFS, (mvcScaleFactor*MaxLumaFS) is multiplied by a as in the mathematical expression (Expression 4a). Thus, the MaxView in this case is double of MaxView (the mathematical expression (Expression 4b)) when the image size 125 (PicHeight*PicWidth) is larger than LumaFS. It should be noted that a can be set to 3 or 4 depending on how to determine the picture size (LumaFS). Furthermore, it is also possible to define a plurality of different values such as LumaFS_1 and LumaFS_2 instead of LumaFS, and to transform the mathematical expressions or the logical expressions ((Expression 4a) and (Expression 4b)) as below.

$$\alpha=\text{Floor}(\text{MaxLumaFS}/\text{LumaFS\_1})$$

$$\beta=\text{Floor}(\text{MaxLumaFS}/\text{LumaFS\_2})$$

$$\text{If}(\text{LumaFS\_2} < \text{PicHeight}*\text{PicWidth} \leq \text{LumaFS\_1})$$

$$\text{MaxView}=\text{mvcScaleFactor}*\text{MaxLumaFS}*\alpha \quad \text{(Expression 4c)}$$

$$\text{Else if}(\text{PicHeight}*\text{PicWidth\_LumaFS\_2})$$

$$\text{MaxView}=\text{mvcScaleFactor}*\text{MaxLumaFS}*\beta \quad \text{(Expression 4d)}$$

Else $$\text{MaxView}=\text{mvcScaleFactor}*\text{MaxLumaFS} \quad \text{(Expression 4e)}$$

For example, α is 2 when a picture size (LumaFS_1) is a half of MaxLumaFS, and β is 4 when a picture size (LumaFS_2) is a quarter of MaxLumaFS. When the image size 125 (PicHeight*PicWidth) is smaller than LumaFS_2, as in the mathematical expression (Expression 4d), (mvcScaleFactor*MaxLumaFS) is multiplied by β. Thus, the MaxView in this case is quadruple of MaxView (the mathematical expression (Expression 4e)) when the image size 125 (PicHeight*PicWidth) is larger than LumaFS_1. It is obvious that similar processing can be performed similarly by defining three or more different values as LumaFS.

Here, mvcScaleFactor is a predetermined fixed value, and the maximum number of views calculator 104 stores a value of mvcScaleFactor. Normally, the value of mvcScaleFactor is set according to the number of views for use in multiview video coding (for example, the value is set to a large value when the number of views is large). However, it is impossible to make the value of mvcScaleFactor variable in order to determine in advance the memory capacity of the picture memory that should be mounted on the image decoding device. In view of this, for example, the value of mvcScaleFactor may be varied depending on a level. More specifically, the table T1 in FIG. 2 is extended as in FIG. 8, 2 as a mvcScaleFactor is used for levels 1 to 3.1, 3 as a mvcScaleFactor is used for levels 4 to 4.3, and 4 as a mvcScaleFactor is used for levels 5 and over. In this case, the level analyzing unit 103 outputs a corresponding mvcScaleFactor to the maximum number of views calculator 104, based on a level signal 126 representing a level identifier.

Next, the MVC maximum buffer size calculator 105 calculates an MVC maximum buffer size 130 (a maximum buffer size for use in multiview video coding: MvcMaxDpbSize) that is a maximum number of candidate reference pictures for use in multiview video coding according to a mathematical expression (Expression 5) based on the input maximum number of views 129 (MaxView) and the maximum buffer size 128 (MaxDPBSize) (S103).

$$\text{MvcMaxDPBSize}=\text{MaxView}*\text{MaxDPBSize} \quad \text{(Expression 5)}$$

The MVC maximum buffer size 130 (MvcMaxDPBSize) indicates a total number of candidate reference pictures (or views) that should be stored in the picture memory. The candidate reference pictures (or views) have the same picture size as the image size 125 output from the input image control unit 101.

The MvcMaxDPBSize output from the MVC maximum buffer size calculator 105 is input to the MVC encoder 102. The MVC encoder 102 sets a number of pictures (views) in DPB (max_dec_pic_bufferinng) that is the number of pictures (views) in the decoded picture buffer (DPB) to be used when multiview video coding is performed or when the encoded data is decoded by the MVC decoder within a range not exceeding the MvcMaxDPBSize as in a mathematical expression (Expression 6) (S104).

$$\text{max\_dec\_pic\_buffering} \leq \text{MvcMaxDPBSize} \quad \text{(Expression 6)}$$

Here, the value of max_dec_pic_buffering is arbitrarily set by the image encoding device side. For example, setting the value of the max_dec_pic_buffering to the same value as the value of MvcMaxDPBSize maximizes the number of candidate reference pictures in inter-picture prediction and the number of candidate reference views in inter-view prediction, and thus higher-resolution coding is expected. However, setting the value of the max_dec_pic_buffering to a large value makes coding complex and increases the processing load. Therefore, actually, the value of max_dec_pic_buffering is set considering the balance.

In addition, the image encoding device 100 is capable of determining how many candidate reference pictures and how many candidate reference views are allocated from among the pictures or views whose number is indicated by max_dec_pic_buffering. It is allowed to reduce the number of candidate reference pictures in inter-picture prediction, and increase the number of candidate reference views in inter-view prediction. Alternatively, the opposite is also possible. For example, when the value of max_dec_pic_buffering is 48, the number of candidate reference pictures in inter-view prediction is set to 7 (=8−1) other than a current view to be encoded, and the number of candidate reference pictures in inter-picture prediction to 5 (=6−1). Alternatively, for example, the number of candidate reference pictures in inter-view prediction is set to 11 (=12−1), and the number of candidate reference pictures for use in inter-picture prediction to 3 (=4−1). Alternatively, for example, the number of candidate reference pictures for use in inter-view prediction is set to 5 (=6−1), and the number of candidate reference pictures for use in inter-picture prediction to 7 (=8−1).

For use in the assignment, the MVC maximum buffer size calculator 105 may output MaxView and MaxDPBSize to the MVC encoder 102 together with MvcMaxDPBSize. Furthermore, the MVC maximum buffer size calculator 105 may be provided inside the MVC encoder 102, and MaxView output from the maximum number of views calculator 104 and MaxDPBSize output from the level analyzing unit 103 may be directly input to the MVC encoder 102. With this configuration, the MVC encoder 102 is capable of setting the number of candidate reference views in inter-view prediction within a range not exceeding (MaxView−1), and setting the number of candidate reference pictures for use in inter-picture prediction within a range not exceeding (MaxDPBSize−1).

Next, multiview video coding operations performed by the MVC encoder 102 are described.

A base view image 123 and an enhancement view image 122 output from the input image control unit 101 are input to the encoding unit of a corresponding view. In other words, the base view image 123 is input to the base view encoding unit 142, and the enhancement view image 122 is input to the enhancement view encoding unit 141. Although the MVC encoder 102 illustrated in FIG. 4 encodes two views that are the base view and the enhancement view, it is possible to realize multiview video coding including two or more enhancement views by coupling such enhancement view encoding units 141 in multiple stages.

The base view encoding unit 142 has functions similar to those of a normal image encoding device which does not perform multiview video coding, and encodes the base view image 123. The base view encoding unit 142 outputs, to the enhancement view encoding unit 141, a reconstructed view image 151 obtained by decoding the base view image 123 encoded inside the base view encoding unit 142.

The enhancement view encoding unit 141 performs inter-view predictive coding on the enhancement view image 122 output from the input image control unit 101 using a reconstructed view image 151. The enhancement view encoding unit 141 is also capable of performing inter-picture prediction (inter prediction) coding using the reconstructed image of a picture having a different time in the same enhancement view. Which one of the coding methods is used is determined for each block.

The view multiplexing unit 143 multiplexes each view, i.e, encoded information of a base view and an enhancement view, to generate an MVC bitstream 124 that is a bitstream already encoded using multiview video coding.

When MvcMaxDPBSize is input from the MVC maximum buffer size calculator 105, the MVC encoder 102 determines the value specified by max_dec_pic_buffering according to the mathematical expression (Expression 6). The MVC encoder 102 reserves an area having the image size 125 (PicHeight*PicWidth) corresponding to the number specified by max_dec_pic_buffering in a picture memory (not illustrated) inside the MVC encoder 102. The reserved area is assigned to the candidate reference views for inter-view prediction and the candidate reference pictures for inter-picture prediction as described above.

The MVC encoder 102 generates a biststream in which the value of max_dec_pic_buffering determined in coding and used in the coding is included in a sequence parameter set (SPS) as one of parameters. The sequence parameter set is a parameter set corresponding to a header which can be used commonly by at least one picture. The sequence parameter set includes a maximum number of possible reference pictures, an image size, and video display information (video usability information (VUI)).

The value of max_dec_pic_buffering may be included in another parameter set such as a video parameter set (VPS), rather than in the SPS. In addition, the value of max_dec_pic_buffering may be included in supplemental information (supplemental enhancement information (SEI)). In this case, the value of max_dec_pic_buffering is notified to the image decoding device via a SEI message.

As described above, the image encoding device 100 according to this embodiment is capable of appropriately calculating the maximum number of candidate reference pictures (views) (MvcMaxDpbSize) for use in mulitiview video coding in a state in which the memory capacity of the picture memory is determined in advance (for example, as in the state of the mathematical expression (Expression 3). The image encoding device 100 is capable of efficiently using a memory area by varying either the number of candidate reference pictures for use in inter-picture prediction or the number of candidate reference views for use in inter-view prediction according to the picture size of encoded data (an input image).

Embodiment 2

Next, Embodiment 2 is described.

Figure 9:
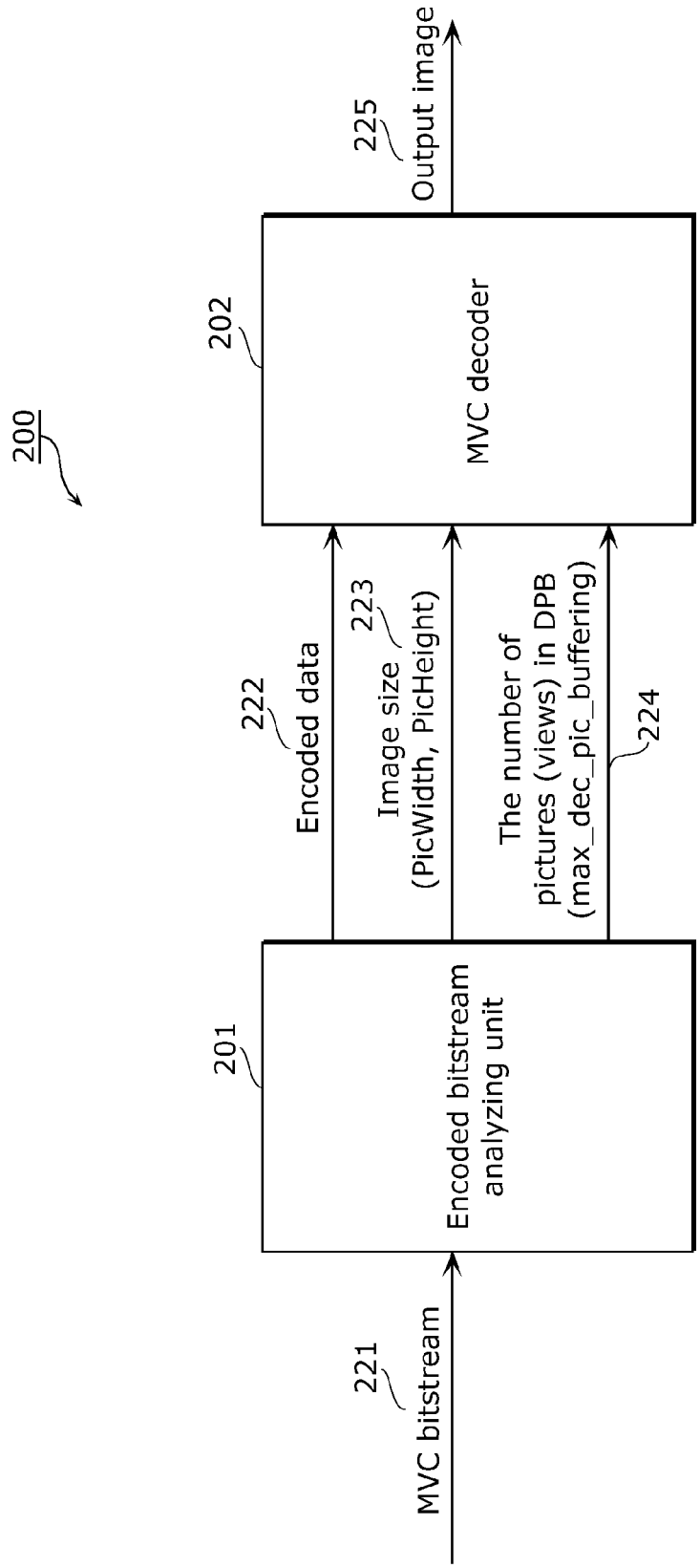
FIG. 9 is a block diagram of an image decoding device according to Embodiment 2.

FIG. 9 is a block diagram indicating a configuration of an image decoding device 200 (a video decoding device) including an MVC decoder according to this embodiment. The image decoding device 200 receives an MVC bitstream 221 including one or more views already encoded using multiview video coding, performs MVC decoding using the MVC decoder, and outputs one or more decoded output images 225 (views) to a display device or the like. For example, the image decoding device 200 decodes an MBC bitstream 124 encoded by the image encoding device 100 according to Embodiment 1.

The image decoding device 200 includes: an encoded bitstream analyzing unit 201 which obtains and analyzes data stored in a header area and an SPS area in the input MVC bitstream 221; and an MVC decoder 202 which decodes the encoded data 222 including the one or more views.

The encoded bitstream analyzing unit 201 obtains and analyzes the data stored in the header area and the SPS area in the input MVC bitstream 221. The SPS includes a maximum number of possible reference pictures, an image size, and video display information (video usability information (VUI)), etc. The encoded bitstream analyzing unit 201 obtains, for example, the value of max_dec_pic_buffering included in the VUI. When a SEI message is input, the encoded bitstream analyzing unit 201 analyzes the information included in the SEI message, and obtains necessary information therefrom.

The MVC decoder 202 decodes the encoded data of the base view and the encoded data of the enhancement view included in the input MVC bitstream 221, and outputs an output image 225 (view) obtained through the decoding. In the decoding of each view, the parameter information output from the encoded bitstream analyzing unit 201 and parameter information included in a lower layer (such as a slice header) in the bitstream and extracted from the MVC decoder 202 are used as parameters. The parameter information output from the encoded bitstream analyzing unit 201 includes information that is an image size 223 (PicHeight and PicWidth) and the number of pictures (views) in DPB 224 (max_dec_pic_buffering).

Figure 10:
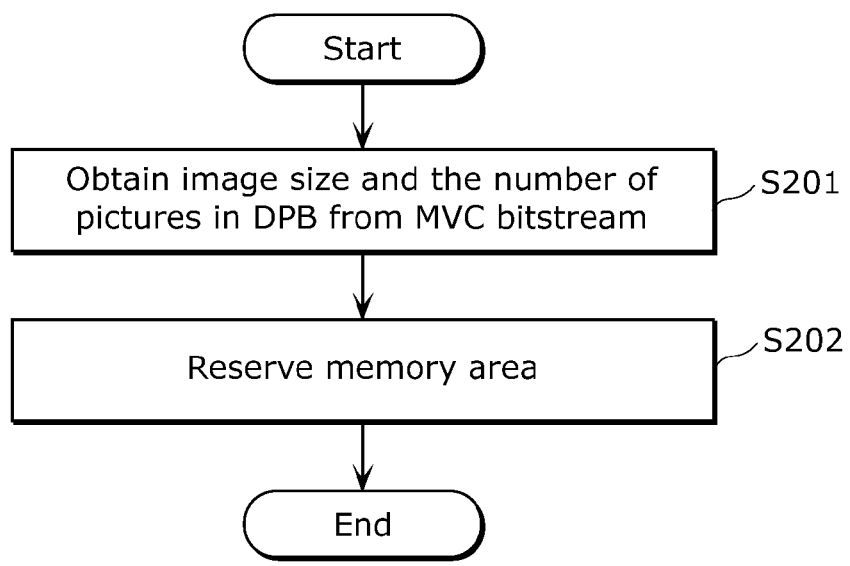
FIG. 10 is a flowchart of image decoding processes according to Embodiment 2.

Next, operations performed by the image decoding device are described. FIG. 10 is a flowchart indicating a flow of image decoding processes performed by the image decoding device 200.

When the MVC bitstream 221 is input to the image decoding device 200, firstly, the encoded bitstream analyzing unit 201 extracts, from the MVC bitstream 221, various kinds of information such as the image size 223 (PicHeight and PicWidth), the number of pictures (views) in DPB 224 (max_dec_pic_buffering), and the encoded data 222 (S201). The extracted information that is the image size 223 (PicHeight and PicWidth), the number of pictures (views) in DPB 224 (max_dec_pic_buffering), and the encoded data 222 are output to the MVC decoder 202. Although not particularly described, the other extracted information is output to the MVC decoder 202 as necessary.

Upon receiving the image size 223 (PicHeight and PicWidth), the number of pictures (views) in DPB 224 (max_dec_pic_buffering), and the encoded data 222, the MVC decoder 202 reserves a picture memory area (not illustrated) prior to decoding of the encoded data 222 (S202). Specifically, the MVC decoder 202 reserves, in the picture memory (DPB), the picture area having the image size 223 (PicHeight*PicWidth) corresponding to the number of pictures specified by max_dec_pic_buffering. The image decoding device 200 is provided in advance with the picture memory having the memory capacity required for the coding level supported thereby from among coding levels which may be identified by level identifiers in the table T1 (see FIG. 2). In other words, the image decoding device 200 includes the picture memory having the memory capacity corresponding to the maximum number of storable pixels (at the time of multiview video coding) given according to the mathematical expression (Expression 3).

As described above, the image encoding device 100 according to Embodiment 1 determines the maximum buffer size (MVC maximum buffer size 130: MvcMaxDPBSize) at the time of multiview video coding, so as not to exceed the maximum number of storable pixels (at the time of multiview video coding). The maximum buffer size (MvcMaxDPBSize) at the time of multiview video coding indicates a total number of candidate reference pictures (or views) that should be stored in the picture memory. As in the mathematical expression (Expression 6), the value of max_dec_pic_buffering is determined by the image encoding device 100, so as not to exceed the MvcMaxDPBSize. Accordingly, the image encoding device 100 guarantees that the image decoding device 200 can reserve the picture area having the image size 223 (PicHeight*PicWidth) corresponding to the number of pictures indicated by the max_dec_pic_buffering. Thus, the MVC decoder 202 reserves the picture memory area without suffering from area shortage.

When the reservation of the picture memory area is completed, the MVC decoder 202 decodes the encoded data of the base view and the encoded data of the enhancement view included in the encoded data 222, and outputs the output images 225 (views) obtained through the decoding. At the time of decoding, candidate reference pictures (views), decoded pictures to be displayed, and picture data of current pictures to be decoded etc. are stored in the picture memory.

As described above, the image decoding device 200 according to this embodiment reserves the area in the decoded picture buffer (DPB), based on the image size 223 (PicHeigth*PicWidth), and the value of max_dec_pic_buffering extracted by the encoded bitstream analyzing unit 201. In this way, the image decoding device 200 is capable of decoding the MVC bitstream 221 so as not to exceed the maximum number of storable pixels (a maximum memory capacity) in the picture memory of the image decoding device 200 and not to cause any problem (such as an area shortage in a picture buffer) at the time of decoding.

The image decoding device 200 uses max_dec_pic_buffering determined by the image encoding device capable of appropriately calculating the maximum number (MVCMaxDpbSize) of candidate reference pictures (views) for use in multiview video coding according to the image size, in a state where the memory capacity of the picture memory is constant (for example, as represented by the mathematical expression (Expression 3)). Thus, the image decoding device 200 is capable of efficiently utilizing the memory area.

Although the image encoding device and the image decoding device according to the above-described embodiments have been described, it should be noted that the present invention is not limited to such embodiments.

Each of the processing units included in the image encoding devices and the image decoding devices according to the above-described embodiments is realized as an LSI which is typically an integrated circuit. These processing units may be made as separate individual chips, or as a single chip to include a part or all thereof.

In addition, the means for circuit integration is not limited to an LSI, and implementation with a dedicated circuit or a general-purpose processor is also available. It is also possible to use a Field Programmable Gate Array (FPGA) that is programmable after the LSI is manufactured, and a reconfigurable processor in which connections and settings of circuit cells within the LSI are reconfigurable.

In the above embodiment, each of the constituent elements may be configured with exclusive hardware or by executing a software program suitable for each of the constituent elements. Each of the constituent elements may be realized by means of the program executing unit such as a CPU or a processor reading and executing such a software program recorded on a hard disc or a semiconductor memory.

Stated differently, the image encoding device and the image decoding device includes processing circuitry and storage electrically connected to the processing circuitry (accessible from the processing circuitry). The processing circuitry includes at least one of exclusive hardware and a program executing unit. In addition, when the processing circuitry includes the program executing unit, the storage stores a software program to be executed by the program executing unit. The processing circuitry executes, using the storage, the image encoding method and the image decoding method according to any of the above embodiments.

Furthermore, the present invention may be implemented as the software program, or as a non-transitory computer-readable recording medium on which the program is stored. In addition, the program can naturally be distributed through communication media such as the Internet.

In addition, all of the numerals used above are examples for specifically explaining the present invention, and the scope of the present invention is not limited to the exemplary numerals.

In addition, divisions into functional blocks in the block diagrams are non-limiting examples. Thus, some of the blocks may be realized as a signal functional block, one of the functional blocks may be divided, and/or part of functions of one of the functional blocks may be transferred to another one of the functional blocks. Similar functions of some of the functional blocks may be processed in parallel or in time division by a single hardware item or software item.

It is to be noted that the processing order of the steps of each of the image encoding methods and the image decoding methods is an example for specifically explaining the present invention, and thus another processing order is possible. In addition, part of the steps may be executed at the same time (in parallel) when any of the other steps is executed.

It should be noted that although the image encoding device and the image decoding device according to one or more aspects of the present invention have been described above based on the exemplary embodiments, the present invention is not limited to the embodiments. Those skilled in the art will readily appreciate that many modifications are possible in the exemplary embodiments and other embodiments are possible by arbitrarily combining the constituent elements of the embodiments without materially departing from the novel teachings and advantageous effects of the present invention. Accordingly, all of the modifications and other embodiments are intended to be included within the scope of the present invention.

Embodiment 3

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 11:
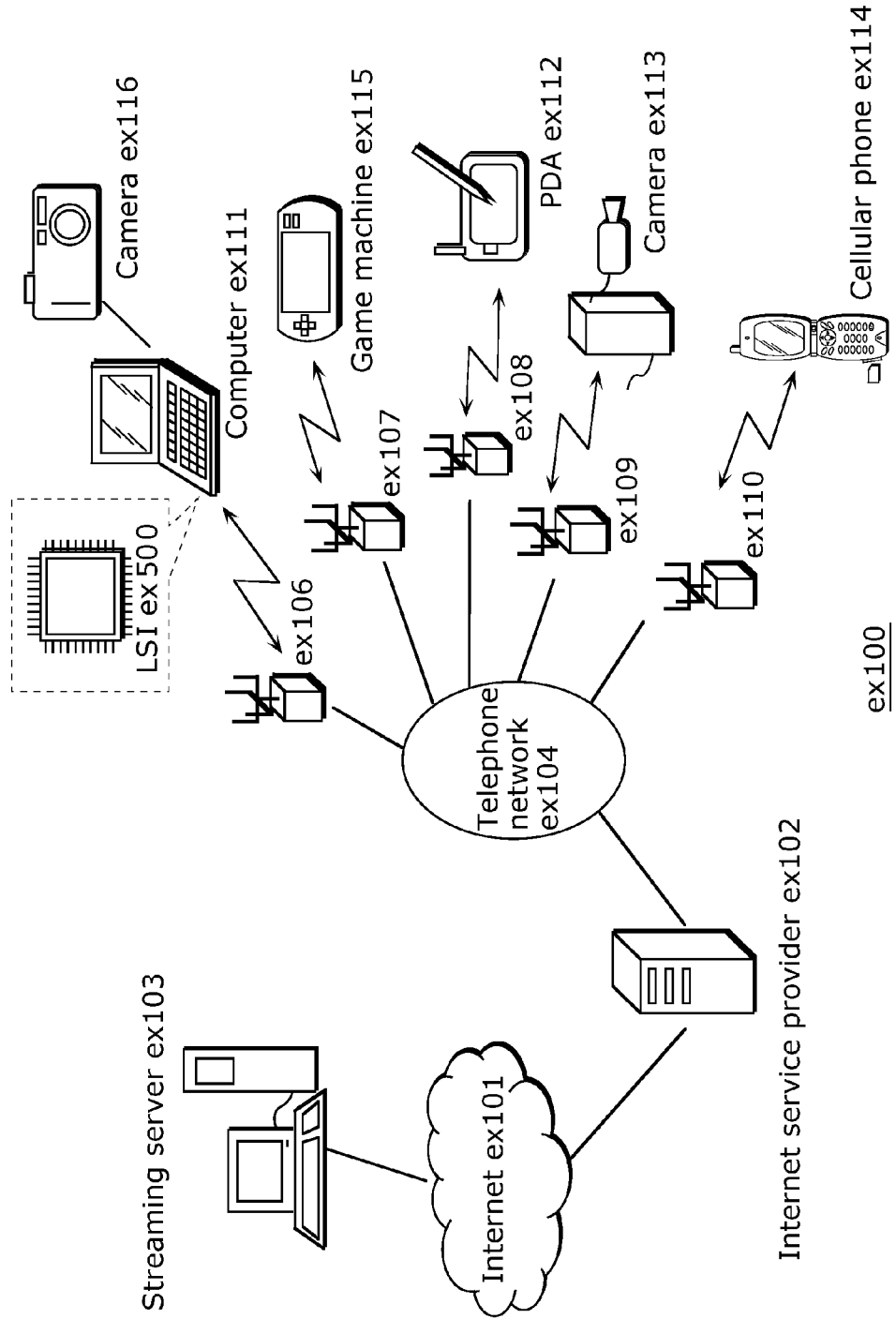
FIG. 11 shows an overall configuration of a content providing system for implementing content distribution services.

FIG. 11 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 11, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present invention), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present invention).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 12:
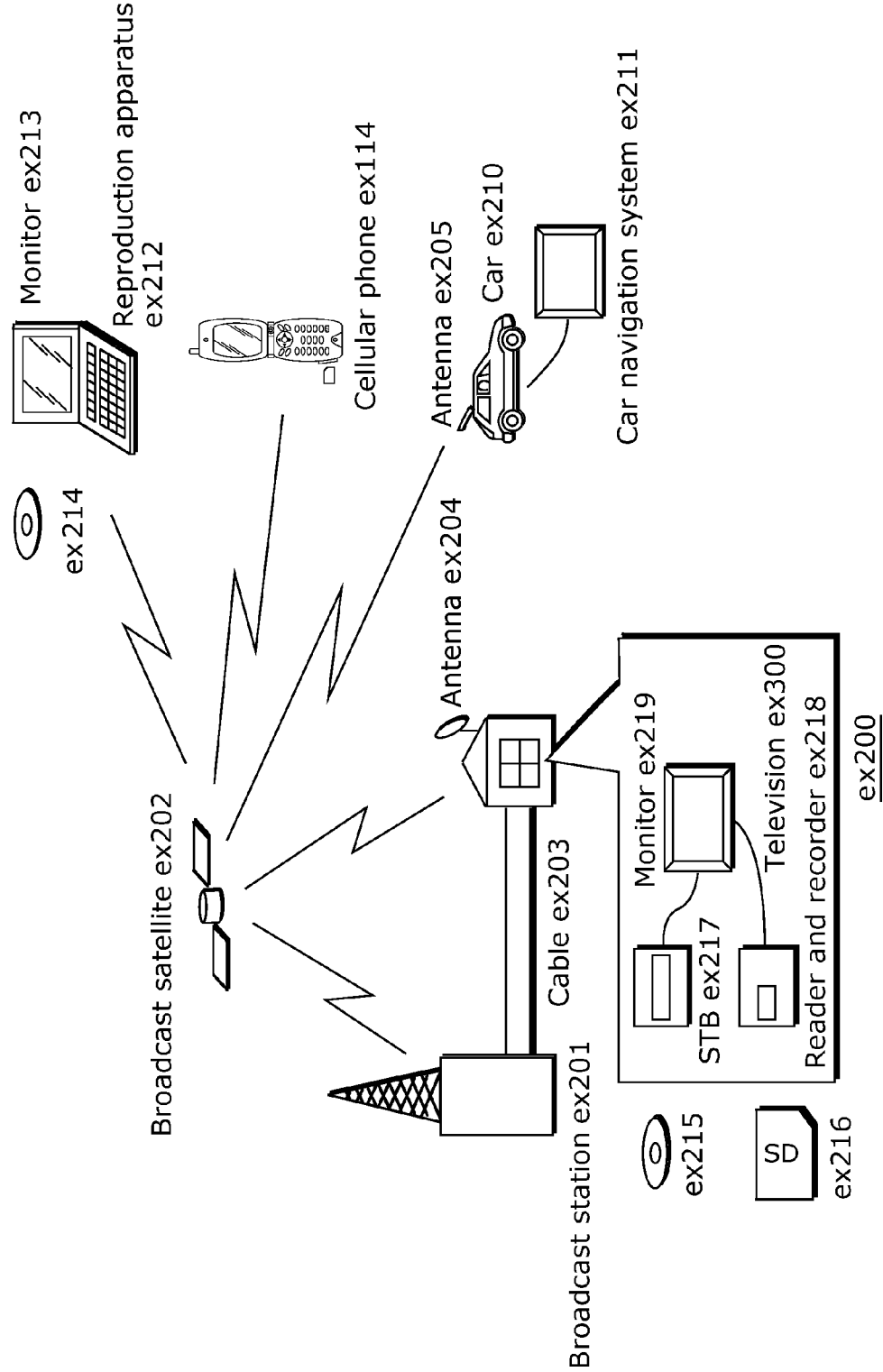
FIG. 12 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 12. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 13:
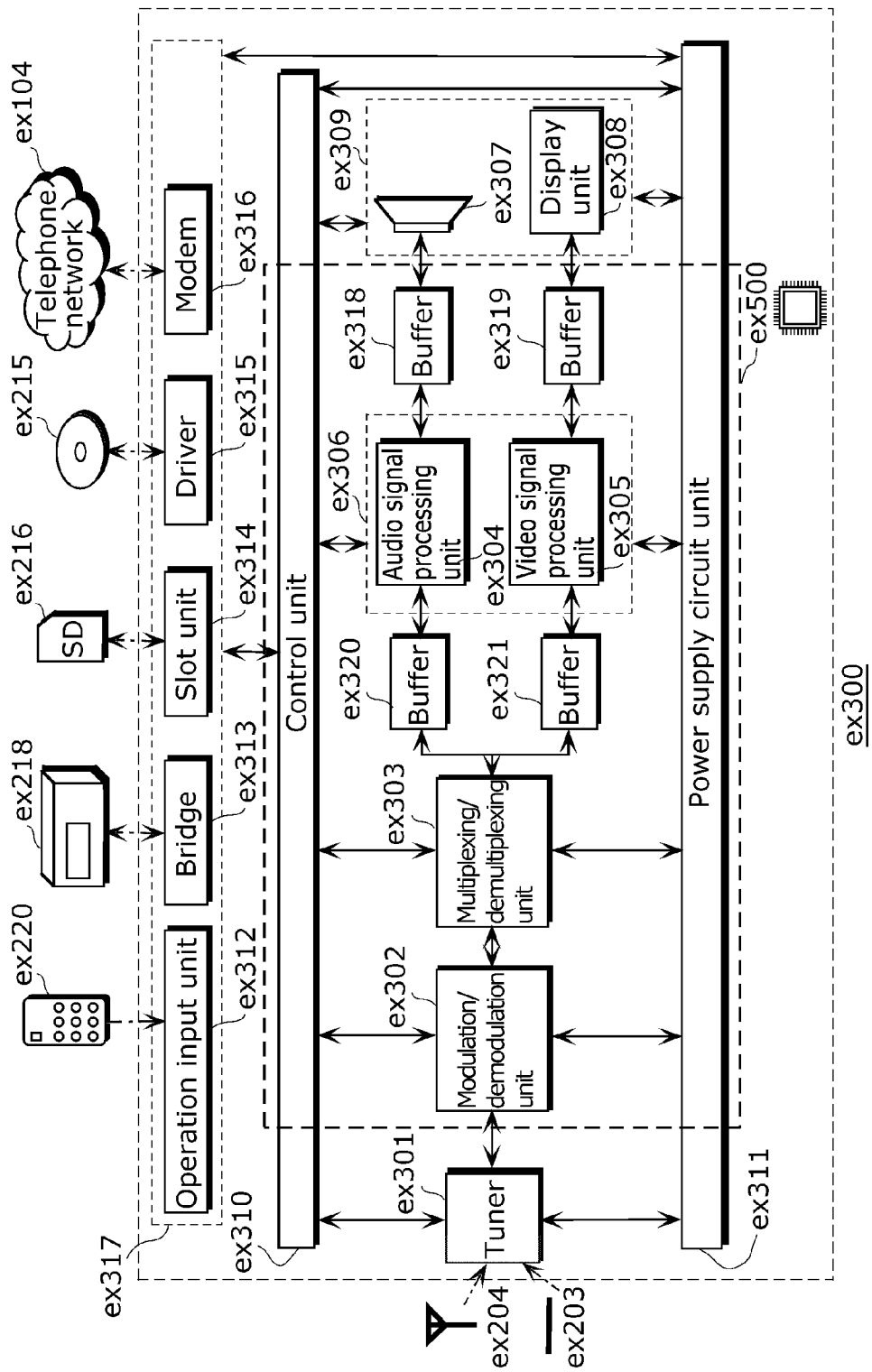
FIG. 13 shows a block diagram illustrating an example of a configuration of a television.

FIG. 13 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 14:
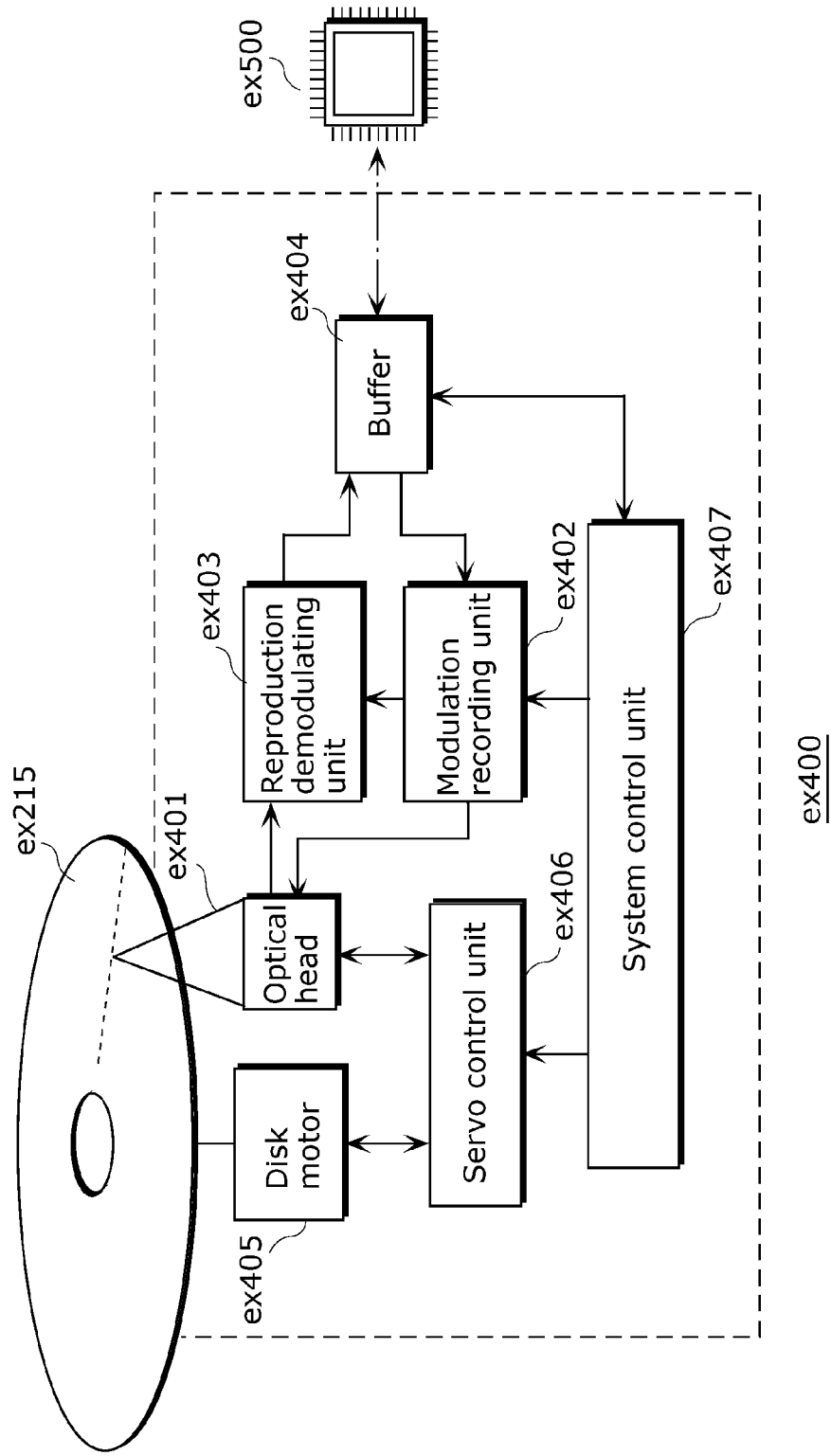
FIG. 14 shows a block diagram illustrating an example of a configuration of an information reproducing/recording unit that reads and writes information from and on a recording medium that is an optical disk.

As an example, FIG. 14 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 15:
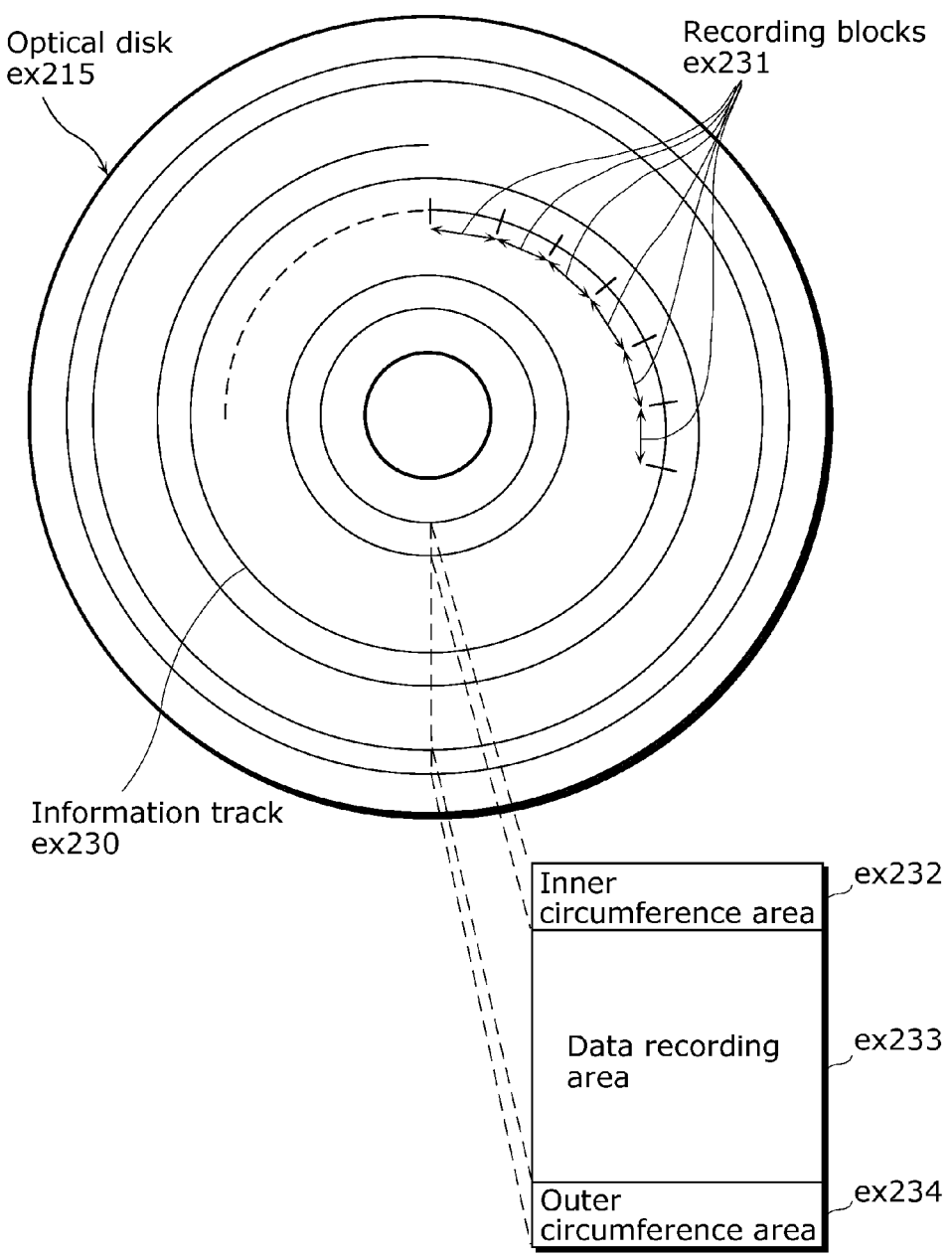
FIG. 15 shows an example of a configuration of a recording medium that is an optical disk.

FIG. 15 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 13. The same will be true for the configuration of the computer ex111, the cellular phone ex114, and others.

Figure 16A:
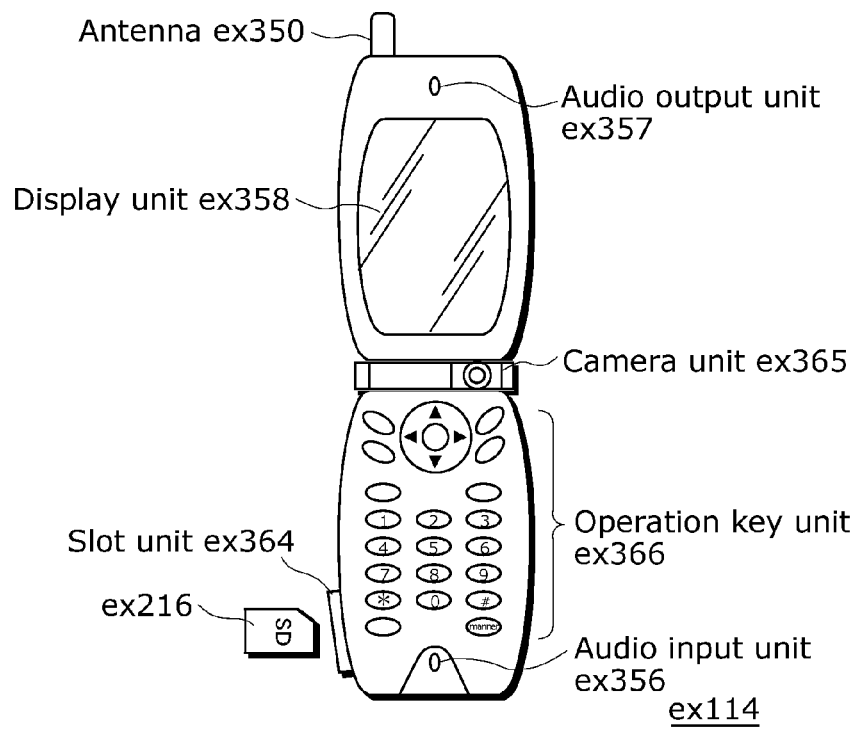
FIG. 16A shows an example of a cellular phone.

FIG. 16A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 16B:
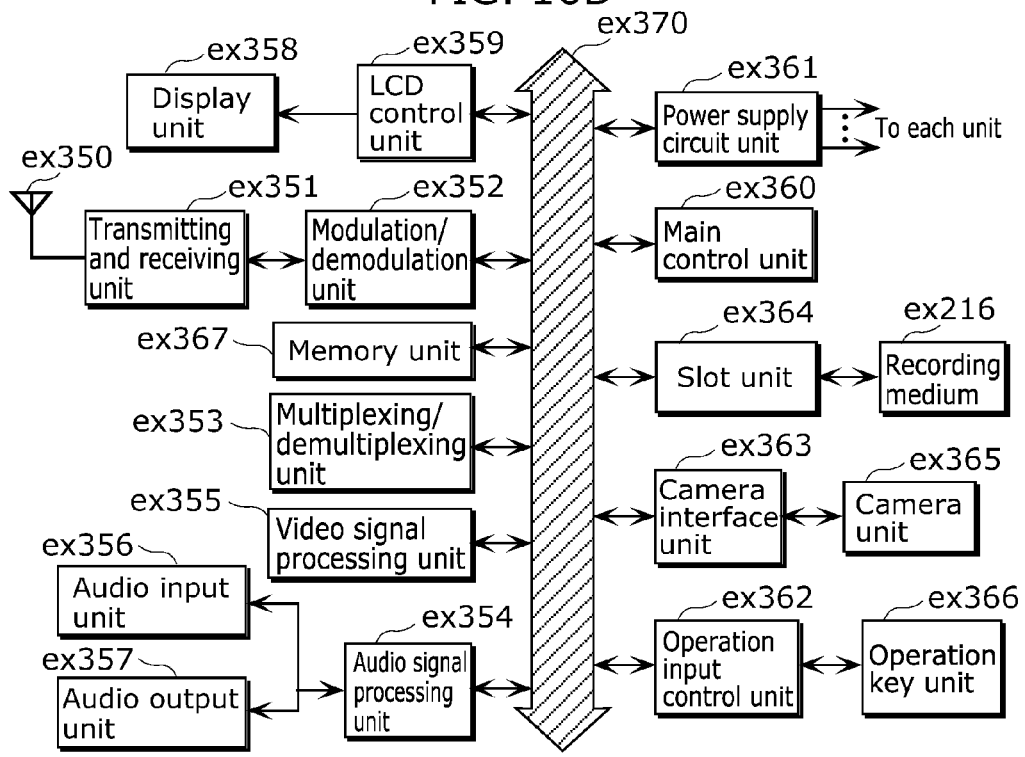
FIG. 16B is a block diagram showing an example of a configuration of a cellular phone.

Next, an example of a configuration of the cellular phone ex114 will be described with reference to FIG. 16B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present invention), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 17 illustrates a structure of the multiplexed data. As illustrated in FIG. 17, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 18:
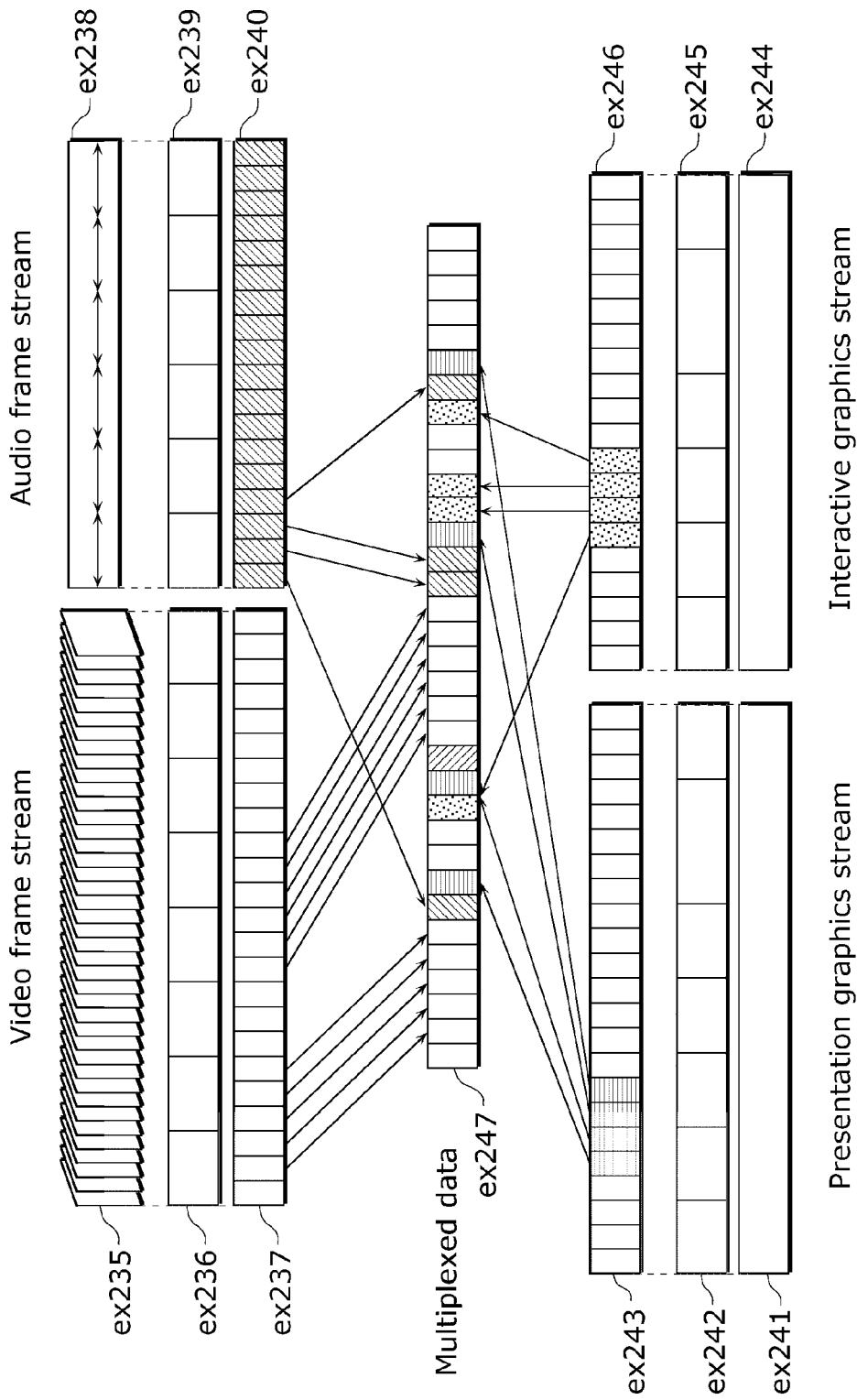
FIG. 18 schematically shows how each stream is multiplexed in multiplexed data.

FIG. 18 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 19:
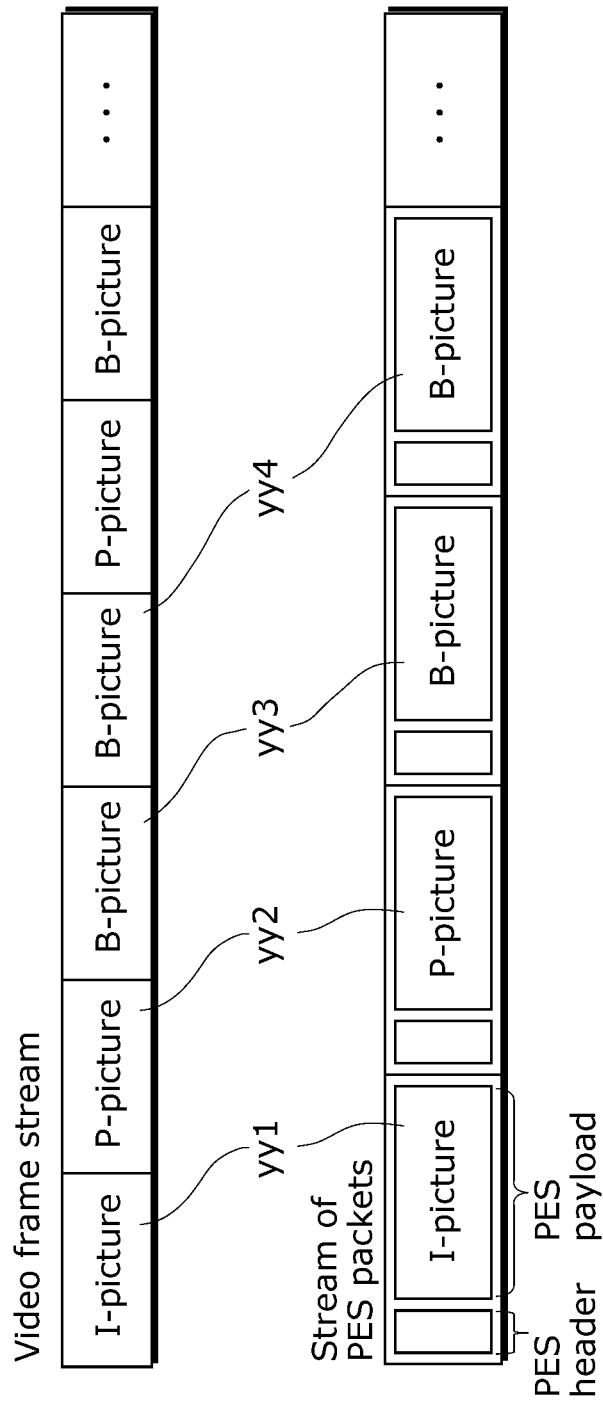
FIG. 19 shows how a video stream is stored in a stream of PES packets in more detail.

FIG. 19 illustrates how a video stream is stored in a stream of PES packets in more detail. The first bar in FIG. 19 shows a video frame stream in a video stream. The second bar shows the stream of PES packets. As indicated by arrows denoted as yy1, yy2, yy3, and yy4 in FIG. 19, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 20 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 20. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 21:
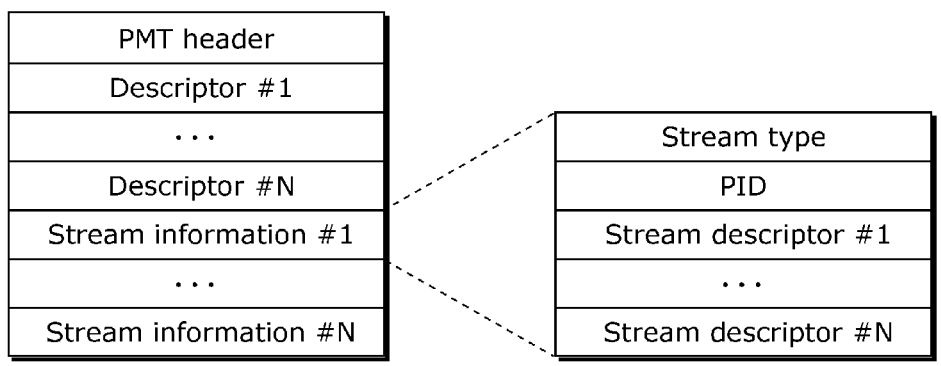
FIG. 21 shows a data structure of a PMT.

FIG. 21 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 22:
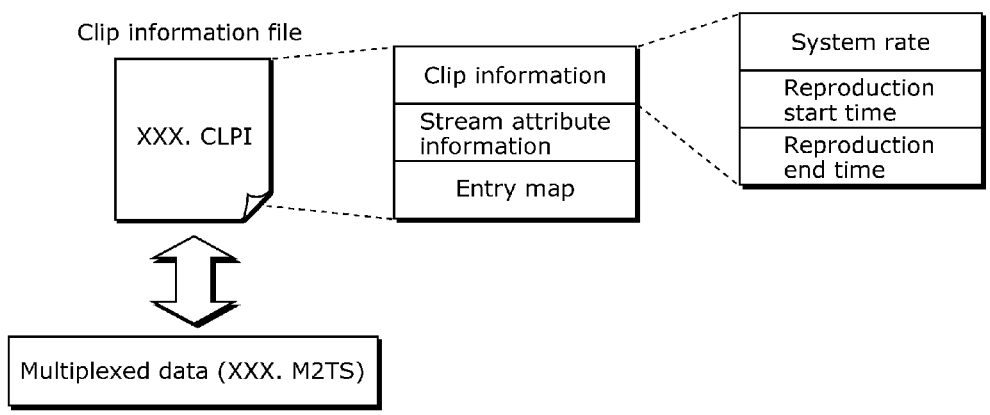
FIG. 22 shows an internal structure of multiplexed data information.

Each of the multiplexed data information files is management information of the multiplexed data as shown in FIG. 22. The multiplexed data information files are in one to one correspondence with the multiplexed data, and each of the files includes multiplexed data information, stream attribute information, and an entry map.

As illustrated in FIG. 22, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 23:
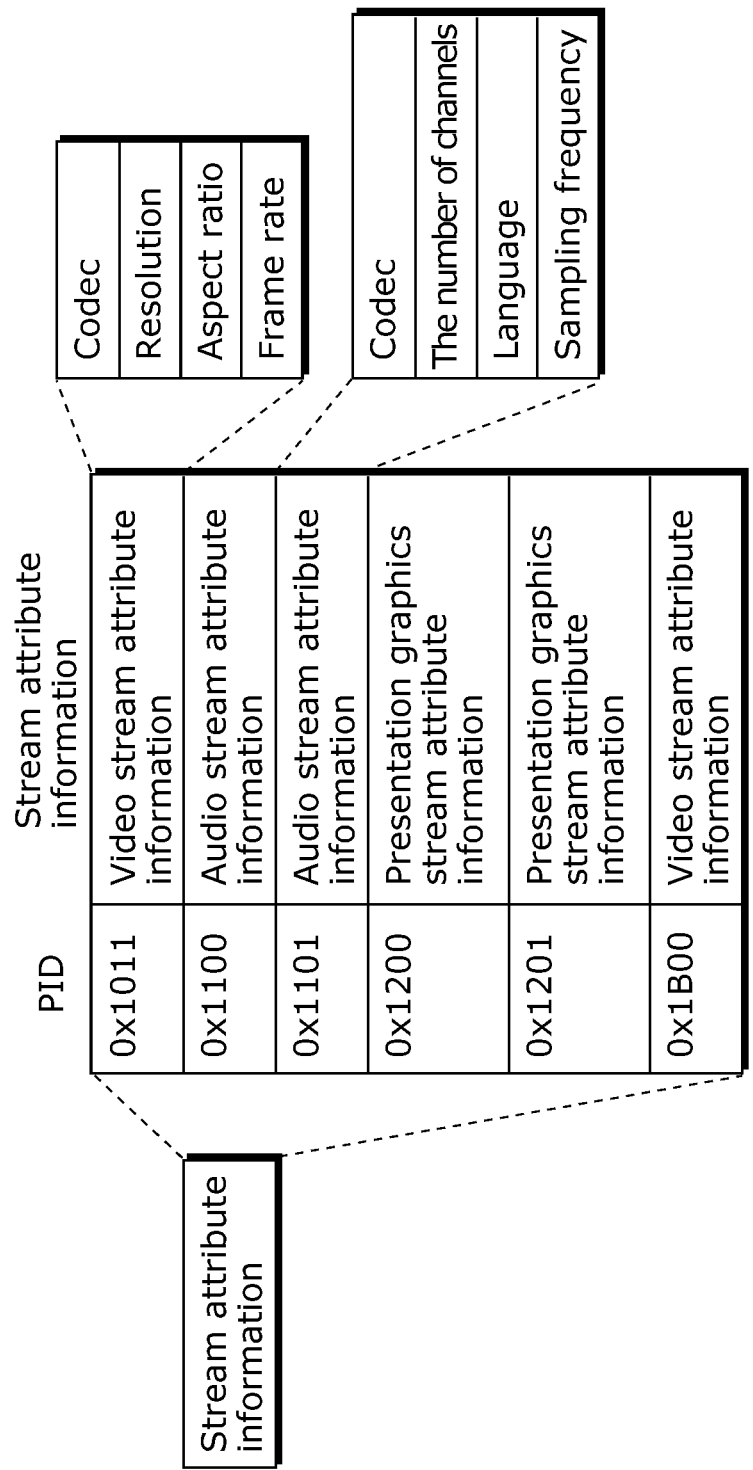
FIG. 23 shows an internal structure of stream attribute information.

As shown in FIG. 23, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 24:
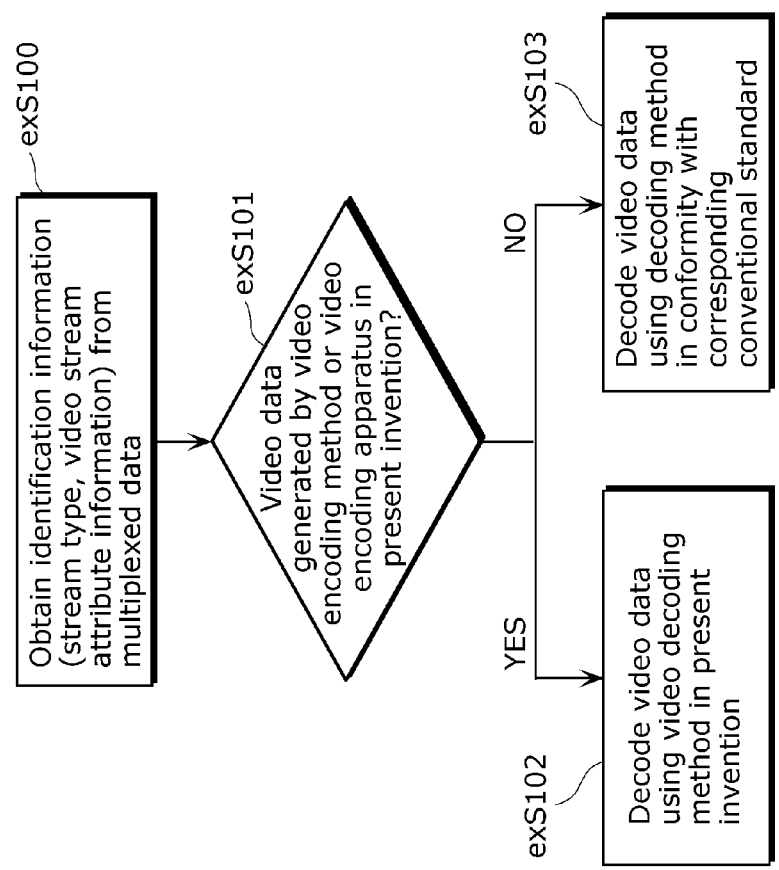
FIG. 24 shows steps for identifying video data.

Furthermore, FIG. 24 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 5

Figure 25:
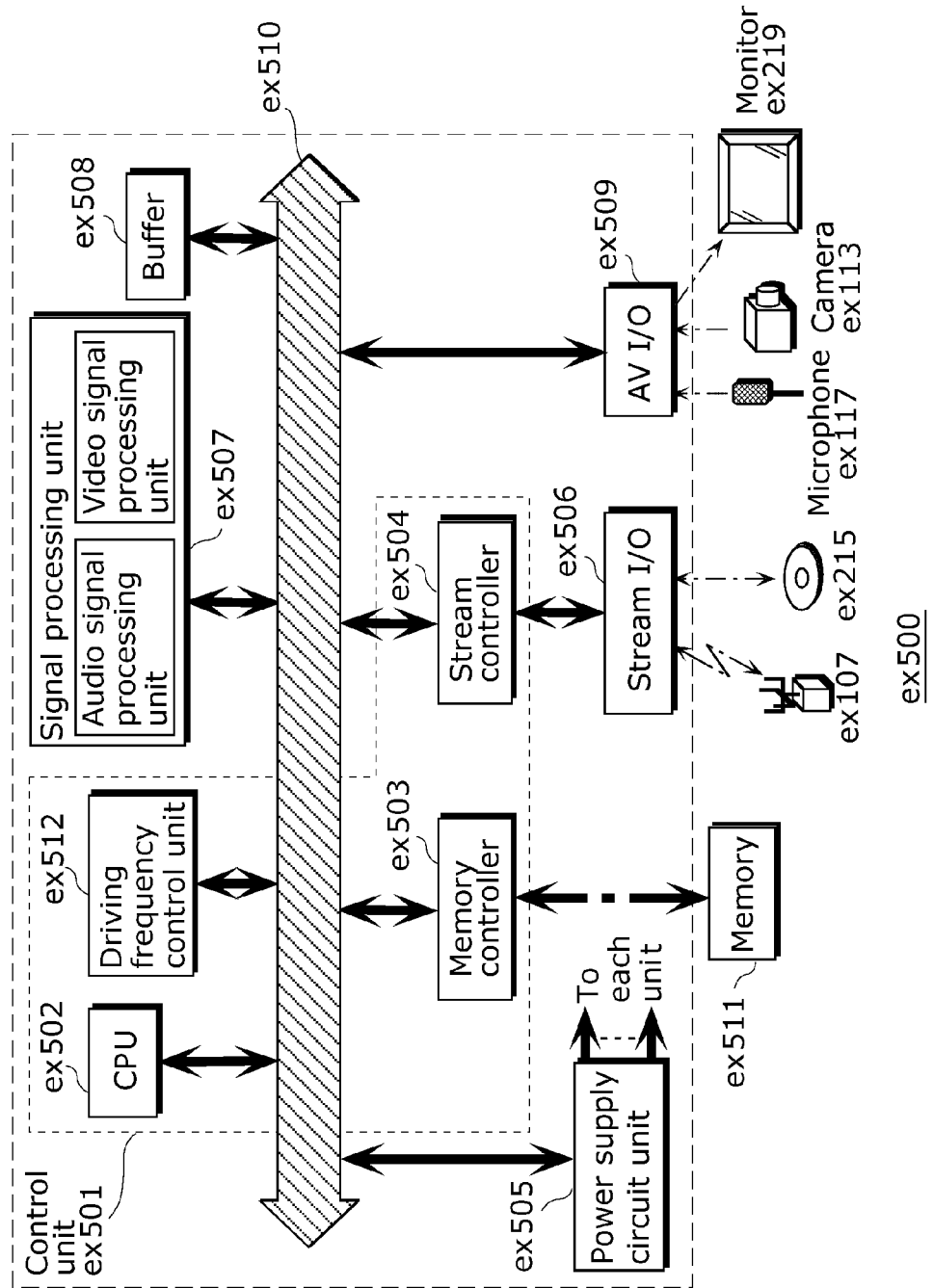
FIG. 25 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 25 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. For example, when the attribute information shows that the stream conforms to the MPEG-4 AVC standard, the stream is decoded on a block-by-block basis using a motion vector not selected from the candidates but calculated from a motion vector of at least one block that is spatially or temporally adjacent to a current block.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, there is a problem that the power consumption increases when the driving frequency is set higher.

Figure 26:
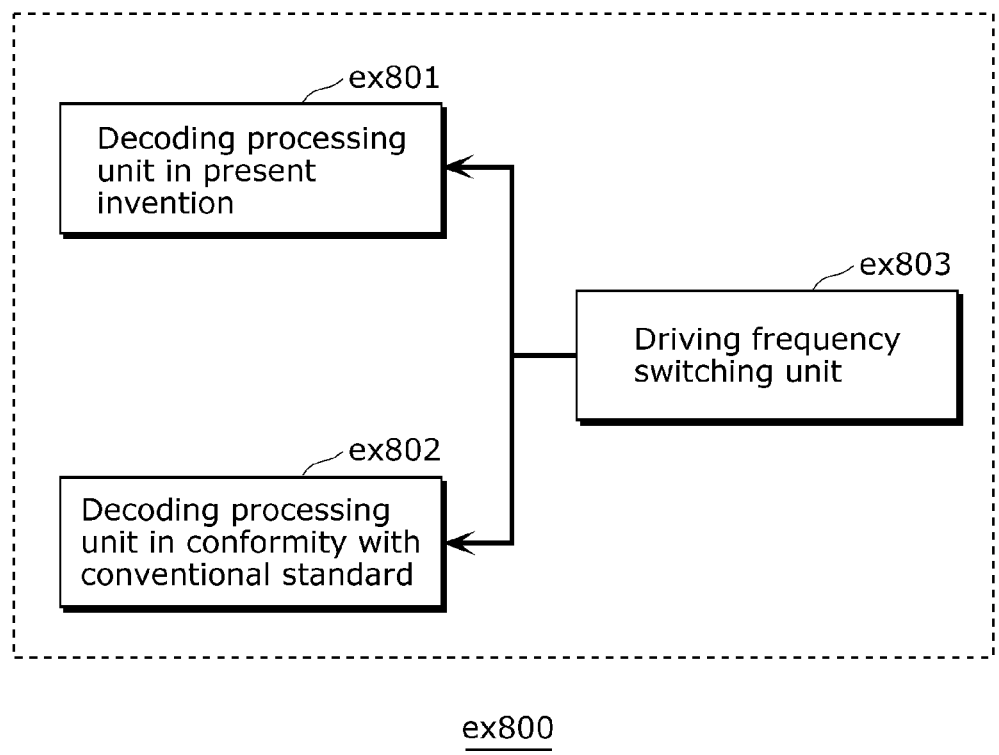
FIG. 26 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 26 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 25. Here, each of the decoding processing unit ex801 that executes the moving picture decoding method described in each of embodiments and the decoding processing unit ex802 that conforms to the conventional standard corresponds to the signal processing unit ex507 in FIG. 25. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 28. The driving frequency can be selected by storing the look-up table in the buffer ex508 and in an internal memory of an LSI, and with reference to the look-up table by the CPU ex502.

Figure 27:
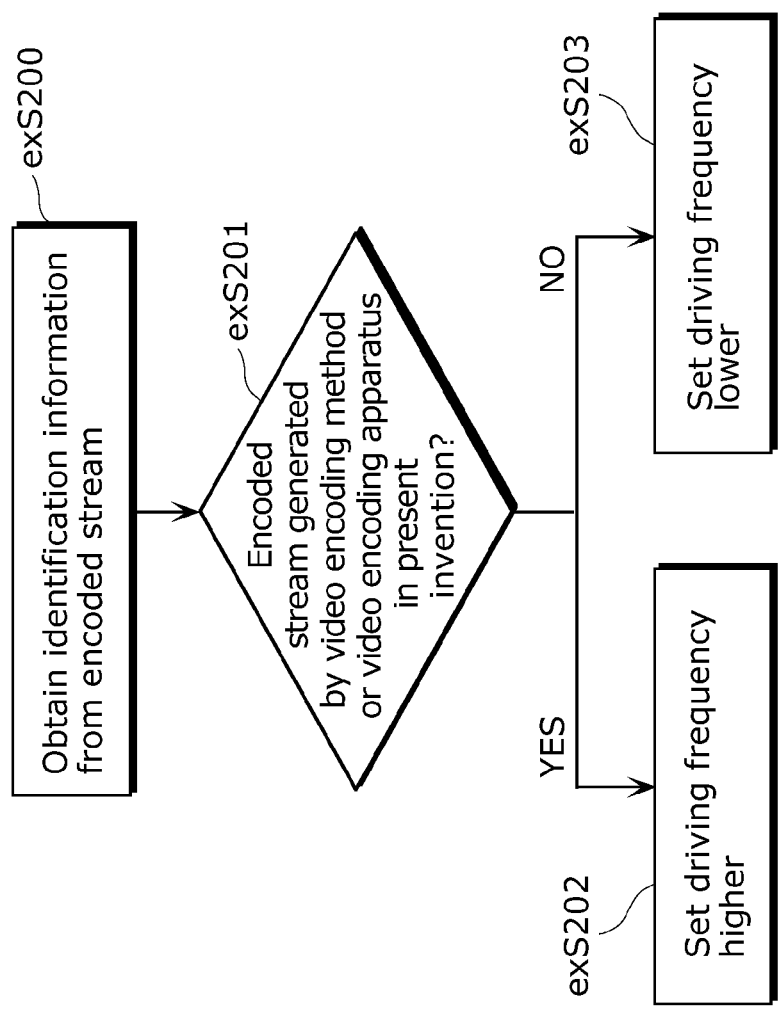
FIG. 27 shows steps for identifying video data and switching between driving frequencies.

FIG. 27 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 29A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present invention and does not conform to MPEG-4 AVC. Since the aspect of the present invention is characterized by buffer control in particular, for example, the dedicated decoding processing unit ex901 is used for buffer control. Otherwise, the decoding processing unit is probably shared for one of the inverse quantization, entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 29B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The present invention is applicable to an image encoding method, an image decoding method, an image encoding device, and an image decoding device. Furthermore, the present invention is applicable to high-resolution information display devices and imaging devices such as television receivers, digital video recorders, car navigation systems, mobile phones, digital cameras, digital video cameras, etc.

REFERENCE SIGNS LIST

100 Image encoding device
101 Input image control unit
102 MVC encoder
103 Level analyzing unit
104 Maximum number of views calculating unit
105 MVC maximum buffer size calculator
121 Input image signal
122 Enhancement view image
123 base view image
124, 221 MVC bitstream
125, 223 Image size
126 Level signal
127 Maximum number of per-picture pixels
128 Maximum buffer size
129 Maximum number of views
130 MVC maximum buffer size
141 Enhancement view encoding unit
142 Base view encoding unit
143 View multiplexing unit
151 Reconstructed view image
152 Enhancement view encoded signal
153 Base view encoded signal
200 Image decoding device
201 Encoded bitstream analyzing unit
202 MVC decoder
222 Encoded data
224 The number of pictures (Views) in DPB
225 Output image

The invention claimed is:
1. An image encoding method for encoding a multiview video, comprising:
determining a maximum number of per-picture pixels and a maximum number of candidate reference images which is used in non-multiview coding, from a level signal indicating a coding level with reference to a table indicating a relationship between (i) the coding level, and (ii-i) a maximum number of candidate reference images for non-multiview coding and (ii-ii) a maximum number of per-picture pixels, the maximum number of per-picture pixels indicating a maximum number of pixels per picture and being processable by an image encoding device and an image decoding device;
calculating a maximum number of candidate reference views for inter-view predictive coding, using the maximum number of per-picture pixels, an image size of an input image, and a scale factor for multiview video coding; calculating a maximum number of candidate reference images for multiview video coding, using the maximum number of candidate reference views and the maximum number of candidate reference images for non-multiview coding; and
encoding the multiview video according to the calculated maximum number of candidate reference views and the calculated maximum number of candidate reference images;
wherein in the calculating of a maximum number of candidate reference views, the maximum number of candidate reference views is calculated according to a mathematical expression below:

$$MaxView = Floor(mvcScaleFactor * MaxLumaFS / (PicHeight * PicWidth)),$$

where MaxView represents the candidate reference view, mvcScaleFactor represents the scale factor, and MaxLumaFs represents the maximum number of per-picture pixels.

2. The image encoding method according to claim 1, wherein in the calculating of a maximum number of candidate reference images for multiview video coding, the maximum number of candidate reference images for multiview video coding is calculated according to a mathematical expression below:

MvcMaxDPBSize=MaxView*MaxDPBSize, where MvcMaxDPBSize represents the maximum number of candidate reference images for multiview video coding, and
MaxDPBSize represents the maximum number of candidate reference images for non-multiview coding.

3. The image encoding method according to claim 1, further comprising
setting the number of candidate reference images for multiview video coding to be stored in a decoded picture buffer within a range not exceeding the maximum number of candidate reference images for multiview video coding.

4. An image encoding device for encoding a multiview video, comprising:
processing circuitry;
storage accessible from the processing circuitry,
wherein the processing circuitry executes, using the storage, the following steps:
determining a maximum number of per-picture pixels and a maximum number of candidate reference images which is used in non-multiview coding, from a level signal indicating a coding level with reference to a table indicating a relationship between (i) the coding level, and (ii-i) a maximum number of candidate reference images for non-multiview coding and (ii-ii) a maximum number of per-picture pixels, the maximum number of per-picture pixels indicating a maximum number of pixels per picture and being processable by an image encoding device and an image decoding device;
calculating a maximum number of candidate reference views for inter-view predictive coding, using the maximum number of per-picture pixels, an image size of an input image, and a scale factor for multiview video coding;
calculating a maximum number of candidate reference images for multiview video coding, using the maximum number of candidate reference views and the maximum number of candidate reference images for non-multiview coding; and
encoding the multiview video according to the calculated maximum number of candidate reference views and the calculated maximum number of candidate reference images,
wherein in the calculating of a maximum number of candidate reference views, the maximum number of candidate reference views is calculated according to a mathematical expression below:

MaxView=Floor(mvcScaleFactor*MaxLumaFS/(PicHeight*PicWidth)), where MaxView represents the candidate reference view, mvcScaleFactor represents the scale factor, and
MaxLumaFs represents the maximum number of per-picture pixels.

5. An image encoding method for encoding a multiview video, comprising:
determining a maximum number of per-picture pixels and a maximum number of candidate reference images which is used in non-multiview coding, from a level signal indicating a coding level with reference to a table indicating a relationship between (i) the coding level, and (ii-i) a maximum number of candidate reference images for non-multiview coding and (ii-ii) a maximum number of per-picture pixels, the maximum number of per-picture pixels indicating a maximum number of pixels per picture and being processable by an image encoding device and an image decoding device;
calculating a maximum number of candidate reference views for inter-view predictive coding, using the maximum number of per-picture pixels, an image size of an input image, and a scale factor for multiview video coding; calculating a maximum number of candidate reference images for multiview video coding, using the maximum number of candidate reference views and the maximum number of candidate reference images for non-multiview coding;
setting the number of candidate reference images for multiview video coding to be stored in a decoded picture buffer within a range not exceeding the maximum number of candidate reference images for multiview video coding; and
encoding the multiview video according to the calculated maximum number of candidate reference views and the calculated maximum number of candidate reference images;
wherein in the calculating of a maximum number of candidate reference views, the maximum number of candidate reference views is calculated according to a mathematical expression below:

MaxView=Floor(mvcScaleFactor*MaxLumaFS/(PicHeight*PicWidth)), where MaxView represents the candidate reference view, mvcScaleFactor represents the scale factor, and
MaxLumaFs represents the maximum number of per-picture pixels.

6. The image encoding method according to claim 5, wherein in the calculating of a maximum number of candidate reference images for multiview video coding, the maximum number of candidate reference images for multiview video coding is calculated according to a mathematical expression below:

MvcMaxDPBSize=MaxView*MaxDPBSize, where MvcMaxDPBSize represents the maximum number of candidate reference images for multiview video coding, and
MaxDPBSize represents the maximum number of candidate reference images for non-multiview coding.

7. The image encoding method according to claim 5, further comprising
setting the number of candidate reference images for multiview video coding to be stored in a decoded picture buffer within a range not exceeding the maximum number of candidate reference images for multiview video coding.

* * * * *